Jan. 2, 1934.  H. A. S. HOWARTH  1,942,101
LUBRICATING DEVICE AND SYSTEM
Filed March 14, 1930   9 Sheets-Sheet 1
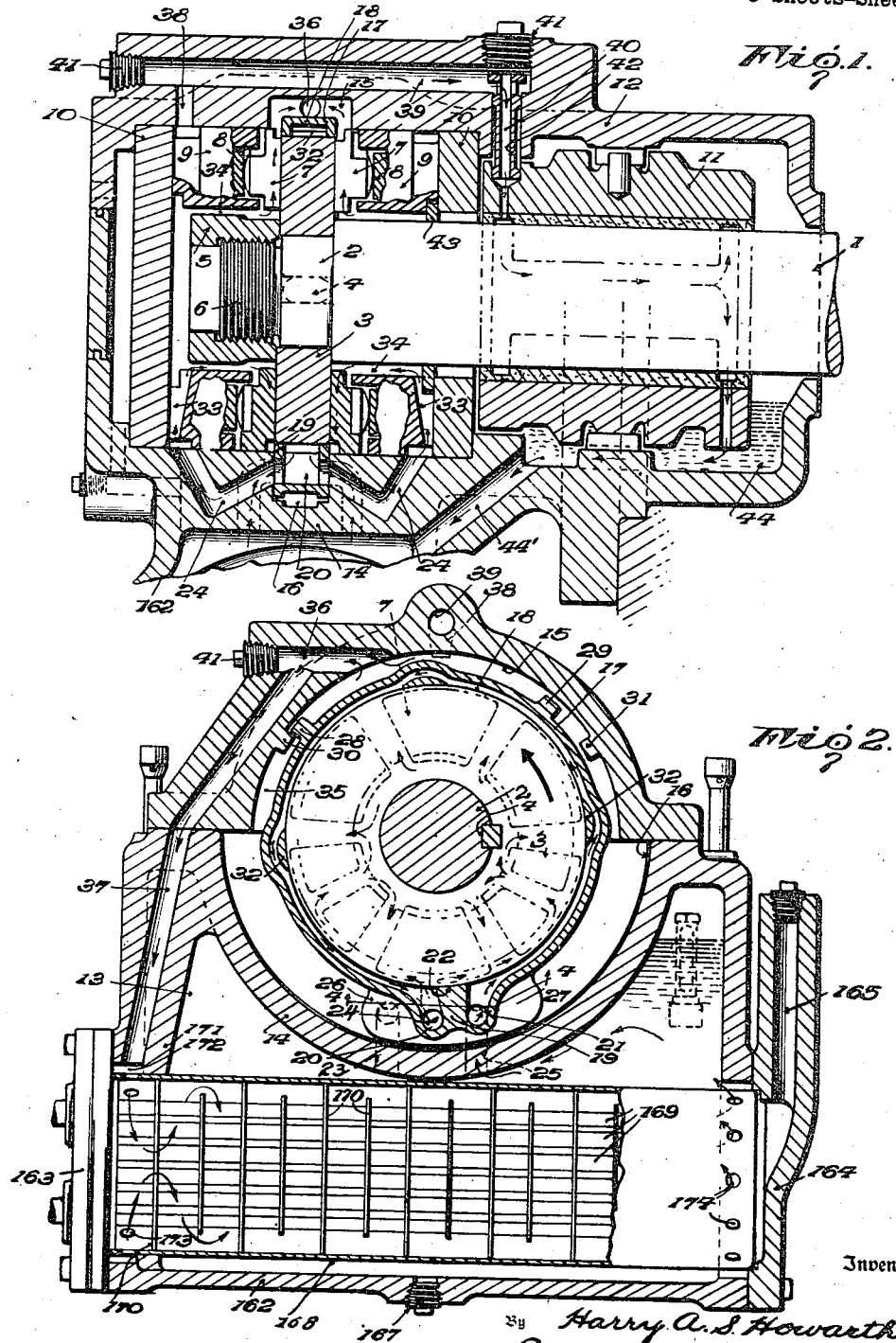
Inventor
Harry A. S. Howarth
By Cameron, Kerkam & Sutton
Attorneys.

Jan. 2, 1934.    H. A. S. HOWARTH    1,942,101
LUBRICATING DEVICE AND SYSTEM
Filed March 14, 1930    9 Sheets-Sheet 2

Inventor
Harry A. S. Howarth.
By Cameron, Kerkam & Sutton
Attorneys

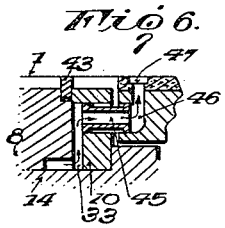
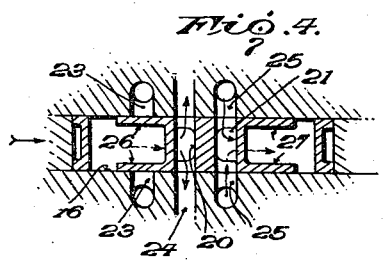
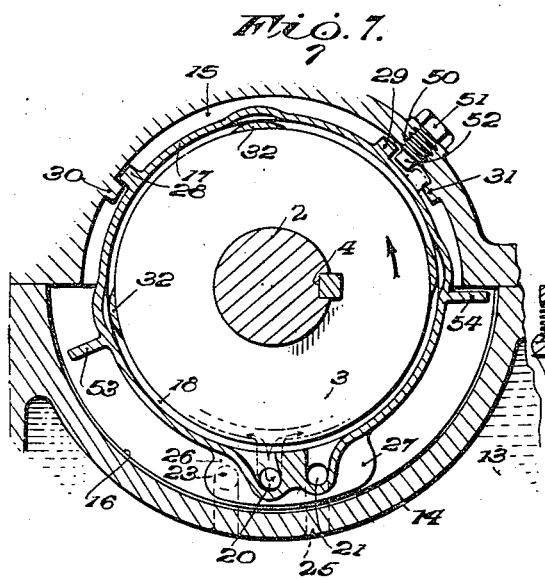
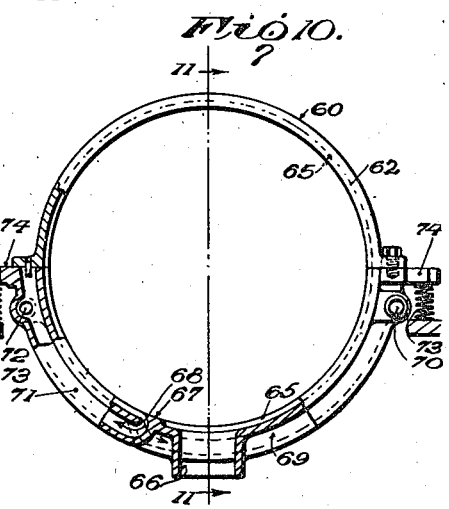
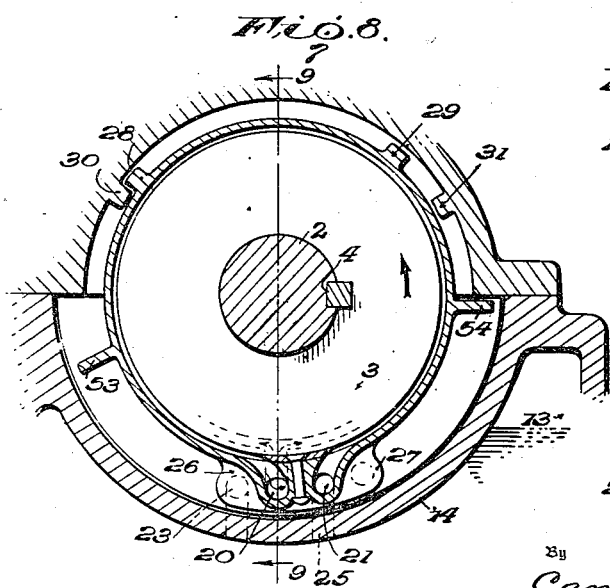
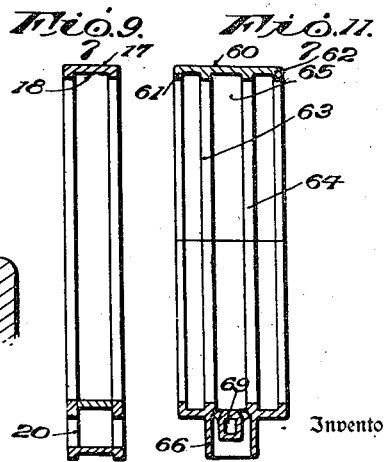

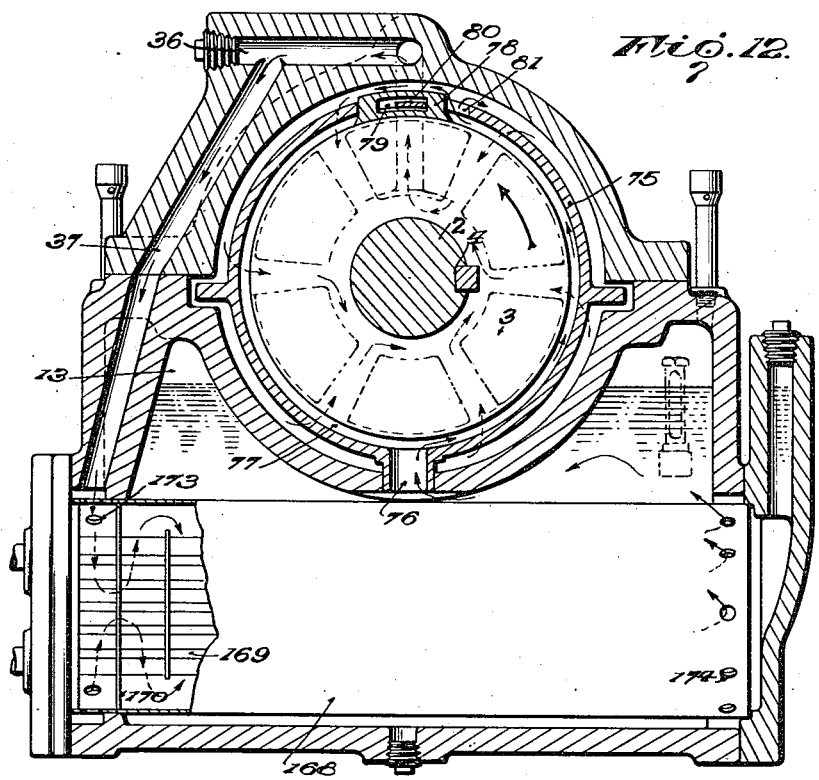
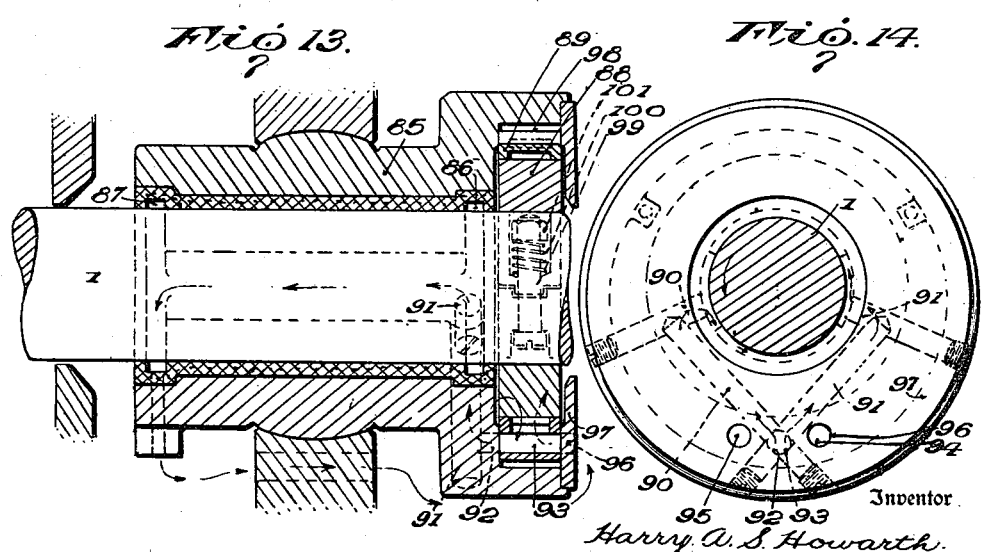

Jan. 2, 1934.  H. A. S. HOWARTH  1,942,101
LUBRICATING DEVICE AND SYSTEM
Filed March 14, 1930  9 Sheets-Sheet 5

Inventor
Harry A. S. Howarth.
By Cameron, Kerkam & Sutton.
Attorneys

Jan. 2, 1934.　　　　H. A. S. HOWARTH　　　　1,942,101
LUBRICATING DEVICE AND SYSTEM
Filed March 14, 1930　　　9 Sheets-Sheet 6
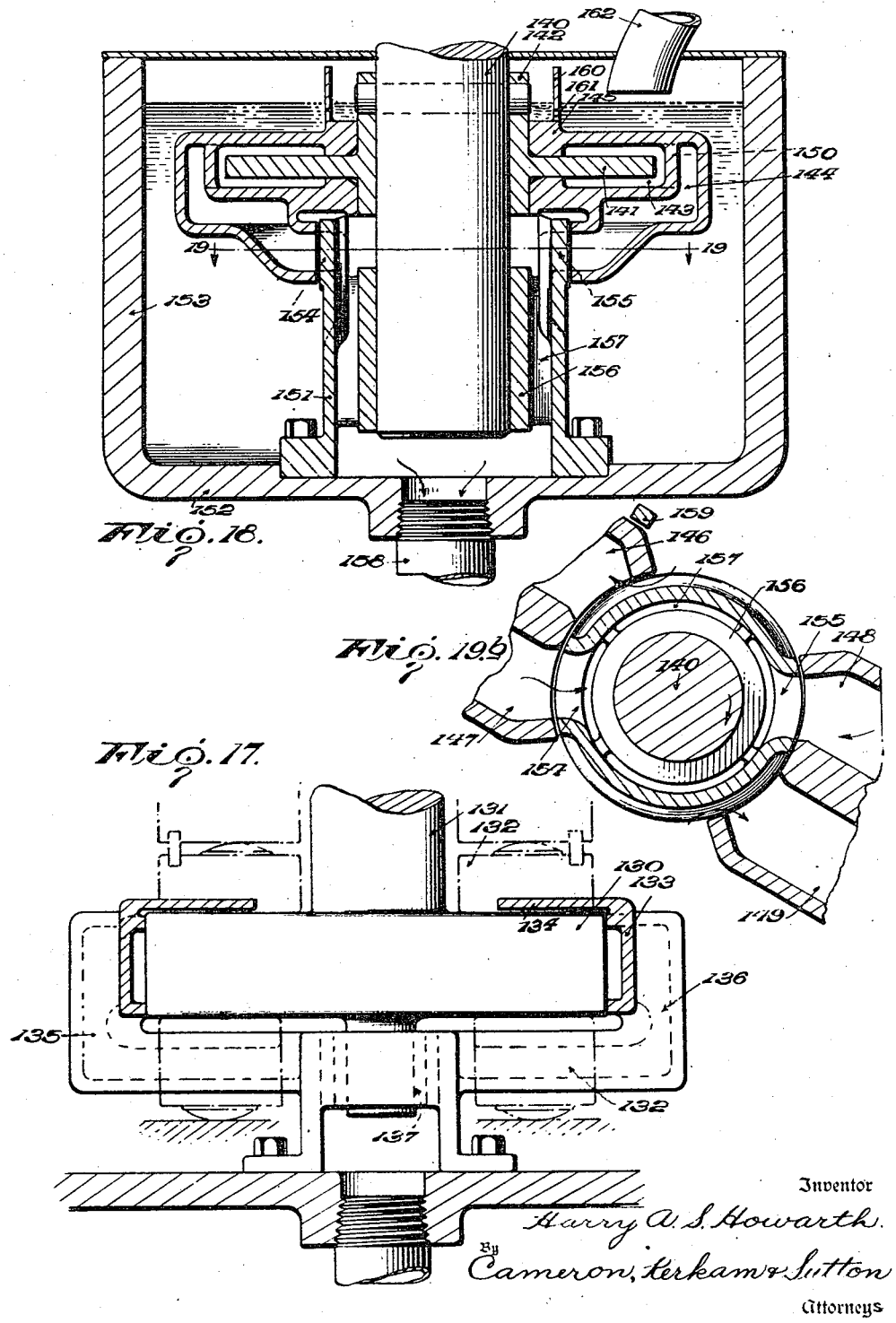

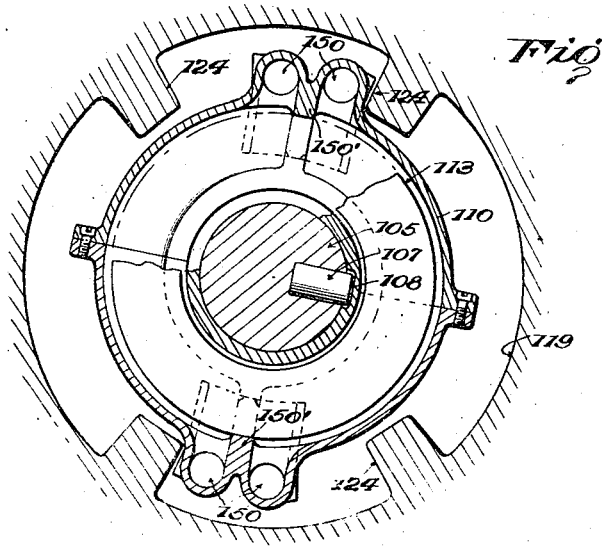
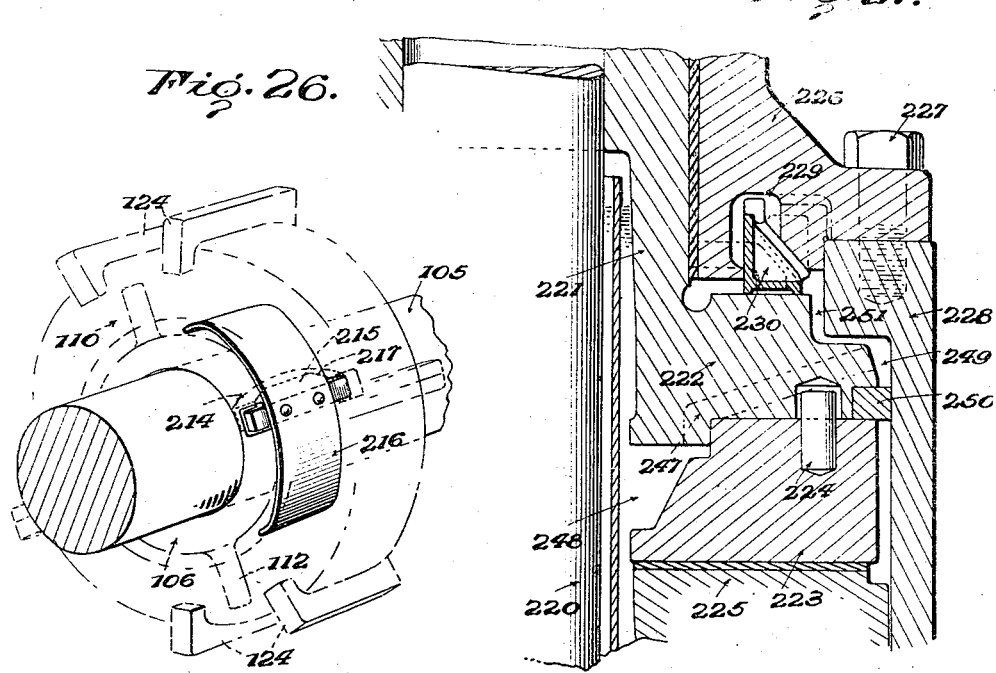

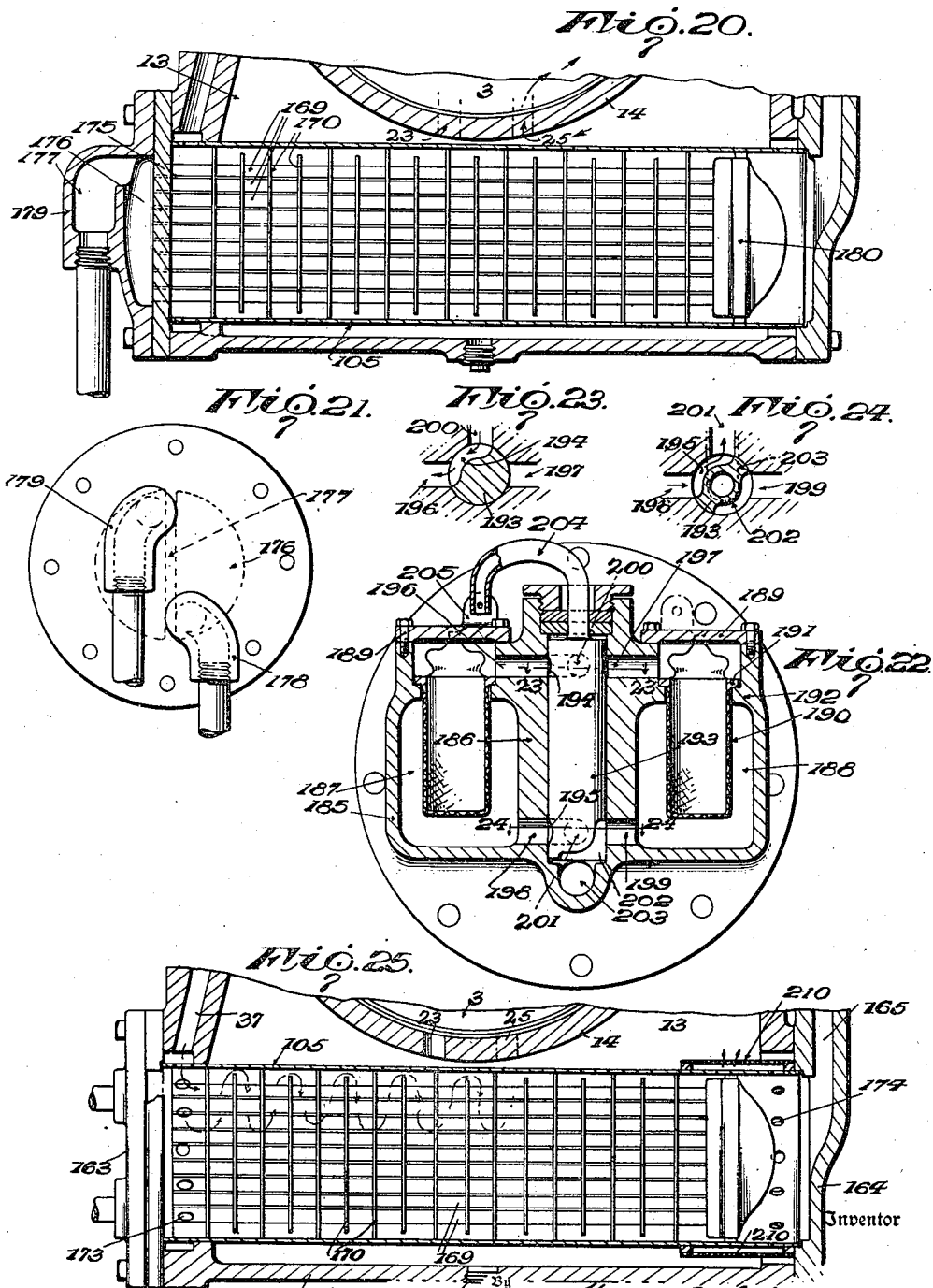

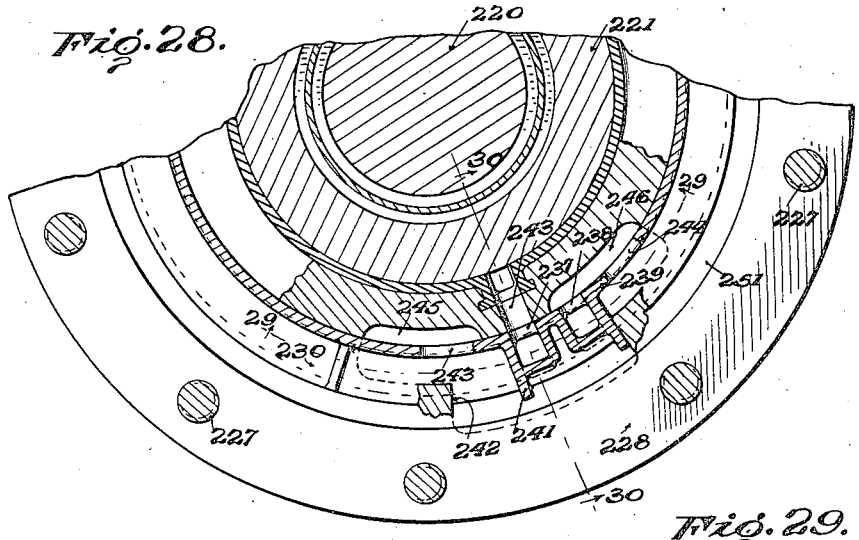
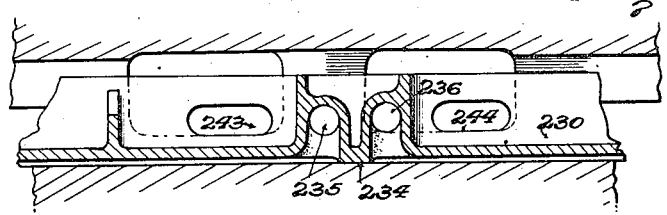
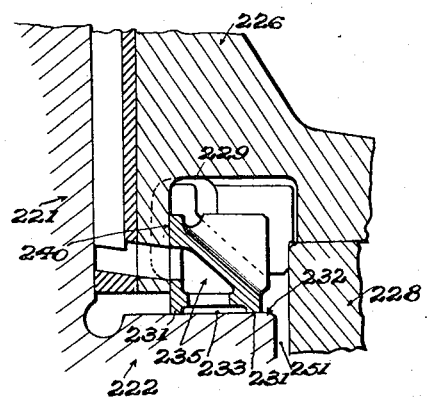

UNITED STATES PATENT OFFICE 1,942,101

LUBRICATING DEVICE AND SYSTEM

Harry A. S. Howarth, Philadelphia, Pa., assignor to Kingsbury Machine Works, Inc., Philadelphia, Pa., a corporation of Delaware Application March 14, 1930. Serial No. 435,881

78 Claims. (Cl. 308—77)

This invention relates to bearings, and more particularly to lubricating means therefor, which means may include in the system devices for cooling the lubricating oil.

It is an object of this invention to provide improved lubricating means which may be employed for the lubrication of thrust bearings, or journal bearings, or combined thrust and journal bearings, as when a guide bearing is associated with a contiguous thrust bearing, or both thrust and journal bearings which may be more or less remote from each other.

Another object of this invention is to provide a novel lubricating device which may be used with horizontal, vertical or inclined shafts and whether the shaft is designed to rotate in one direction only, or may rotate in either direction.

Another object of this invention is to provide a novel lubricating device which will automatically adjust itself for either direction of shaft rotation, so that in the case of shafts designed to rotate in a single direction, it is unnecessary to adapt the construction to the particular direction of rotation employed, and in the case of shafts designed to rotate in both directions, the device is adapted to automatically adjust itself whenever the direction of shaft rotation changes.

Another object of this invention is to provide a novel lubricating device which cooperates with the surface of a shaft collar and takes advantage of the tendency of such a collar to pump oil when associated with adjacent surfaces spaced radially or laterally or both radially and laterally from the surface of the collar, whereby copious quantities of oil may be circulated through a journal bearing or a thrust bearing or both, and whereby sufficient pressure may be developed so that the oil may be utilized in lubricating parts relatively remote from the collar, as for example a journal bearing at the opposite side of the machine, and so that the oil may be vigorously circulated through an appropriate cooling device when desired.

Another object of this invention is to provide a novel lubricating device which may utilize substantially the entire circumferential surface of the collar for developing pressure in the pumped oil.

Another object of this invention is to provide a novel lubricating device in the form of a ring readily mountable on and demountable from a collar and ordinarily nonrotatable with respect thereto, but automatically operative to determine the path of movement of the oil pumped thereby.

Another object of this invention is to provide a lubricating device in the form of a ring mounted on the collar which does not require any special construction of the collar.

Another object of this invention is to provide a lubricating device of the type heretofore characterized which may be readily standardized for different sizes of bearings.

Another object of this invention is to provide a lubricating device of the type heretofore referred to which is so mounted or balanced that there is little or no wear of the collar.

Another object of this invention is to provide a lubricating device of the type heretofore referred to which may be particularly adapted for a single direction of shaft rotation, either by reason of its original construction or by reason of the provision of means whereby the lubricating device may be locked in a predetermined position.

Another object of this invention is to provide a lubricating device of the type heretofore referred to which is so constructed that it cannot be improperly installed with respect to the collar with which it is to cooperate.

Another object of this invention is to provide, in combination with a lubricating device such as heretofore referred to, an oil cooling device which may be readily furnished in unitary relationship with and as a self-contained part of the lubricating system, which is of such construction that it may be readily standardized, which is of compact construction so that it may be mounted directly in or on the bearing housing without undue space consumption, which is so constructed as to assure rapid circulation of the oil through the cooling device and in intimate contact with the cooling elements, and which is so constructed that it may be readily provided with means for assuring that the oil is adequately cleaned.

Another object of this invention is to provide an oil cooling device with means whereby a strainer used for filtering the oil may be cleaned or changed without interrupting the operation of the bearing and if desired whereby new oil may be introduced into the bearing housing at any time.

Another object of this invention is to provide lubricating devices, with or without cooling devices as heretofore characterized, which are simple in construction, which are durable, certain and efficient in operation and which may be readily applied to different sizes and constructions of bearings.

Other objects will appear as the description of the invention proceeds.

The invention is capable of receiving a variety of mechanical expressions, several of which are shown on the accompanying drawings and some of which possess more of the features and advantages of the present invention than others, but it is to be expressly understood that the drawings are for purposes of illustration only and are not intended to be definitions of the limits of the invention, reference being had to the appended claims for that purpose.

Referring in detail to the drawings wherein the same reference numerals are employed to designate corresponding parts in the several figures:

Fig. 1 is a vertical axial section through a combined thrust and journal bearing embodying the present invention;

Fig. 2 is a transverse section through the bearing of Fig. 1, particularly showing the lubricating ring on the periphery of the collar;

Fig. 4 is a fragmentary section on the line 4—4 of Fig. 2;

Fig. 6 is a fragmentary section illustrating in detail the passage leading oil directly to the journal bearing from the thrust bearing chamber;

Fig. 7 is a somewhat diagrammatic section illustrating means for locking the lubricating ring in position;

Fig. 8 is a somewhat diagrammatic section illustrating another form which the lubricating ring may take;

Fig. 9 is a transverse section of the last referred to lubricating ring on line 9—9 of Fig. 8;

Fig. 10 is a diagrammatic section illustrating a form which the lubricating ring may take when the shaft with which it is associated always rotates in the same direction;

Fig. 11 is a section on the line 11—11 of Fig. 10;

Figure 15:
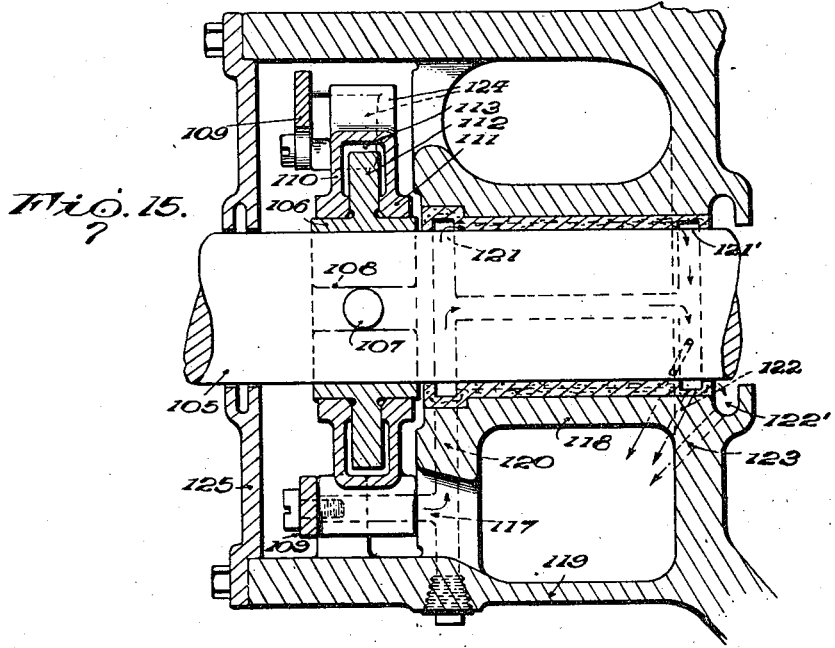
Figure 16:
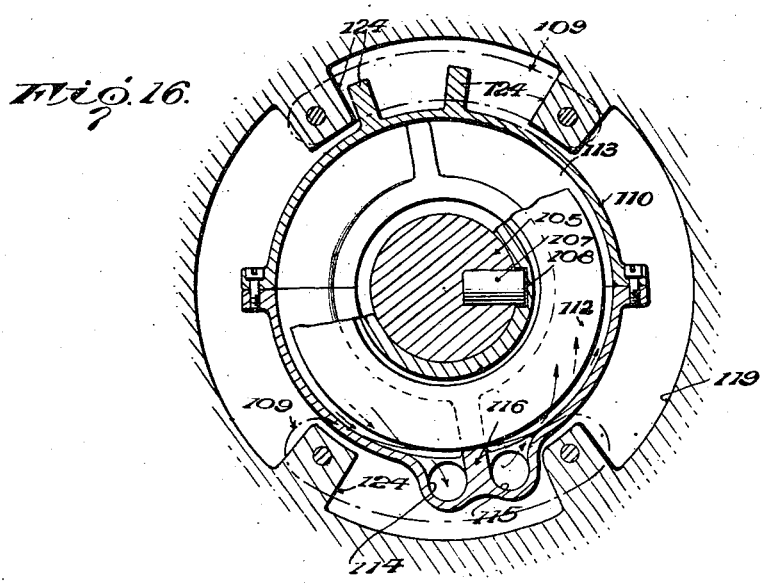

Fig. 12 is a transverse section generally corresponding to Fig. 2 and illustrating the collar provided with a ring in accordance with the broader aspects of this invention but provided with an automatic valve of the type disclosed in my prior Patent No. 1,496,847 granted June 10, 1924 for Valved oil collecting means, which may be used when it is not necessary to use substantially the entire periphery of the collar as an oil pumping surface;

Fig. 13 is an axial section illustrating the present invention applied to the lubrication of a journal bearing;

Fig. 14 is a transverse section illustrating the disposition of the passages in the journal bearing shell;

Fig. 15 is an axial section through another embodiment of the present invention, showing another form of lubricating ring that may be employed in supplying lubricant, as to a journal bearing;

Fig. 16 is a transverse section through the embodiment of Fig. 15;

Fig. 17 is a somewhat diagrammatic vertical section of an embodiment of the present invention applied to a vertical shaft;

Fig. 18 is a vertical section through another embodiment applied to a vertical shaft;

Fig. 19a is a transverse section through the embodiment of Fig. 18;

Fig. 19b is a fragmentary transverse section on the line 19—19 of Fig. 18;

Fig. 20 is a fragmentary section illustrating an oil cooling device embodying one of the features of the present invention;

Fig. 21 is an end view illustrating the water connections of said oil cooling device;

Fig. 22 is a section through a duplex oil strainer embodying certain features of the present invention;

Fig. 23 is a transverse section on the line 23—23 of Fig. 22;

Fig. 24 is a transverse section on the line 24—24 of Fig. 22; and

Fig. 25 illustrates a cooler of the type shown in Fig. 20 provided with another form of oil strainer.

Fig. 26 is a perspective view of an embodiment similar to Fig. 15 but including a provision for readily locking and unlocking a lubricating device in a shaft, as would be advantageous when used on a motor shaft for example;

Fig. 27 is an axial section through another embodiment of the invention in which is used a lateral face of a collar or flanged member for the oil pumping surface and which may be employed to supply oil to a journal bearing above the level of the oil.

Figs. 28, 29 and 30 are fragmentary sections of the embodiment of Fig. 27 taken on the section lines indicated.

In the embodiment of the invention shown in Figs. 1 to 4, the lubricating means provides an oil circulation for lubricating both a thrust bearing, here shown as a double acting thrust bearing although a single acting thrust bearing might equally well be used if desired, and an associated journal or guide bearing, although the journal bearing could be separated from the thrust bearing structure and might be disposed relatively remote therefrom, as at a different part of the machine. This embodiment also illustrates another feature of the present invention, to wit a self-contained oil cooling device unitarily associated with the thrust bearing in the lubricating system, but it is to be expressly understood that the lubricating device of the present invention can be equally well employed with an external oil cooler or with any other suitable provisions for cooling the oil.

In the form shown, the shaft 1 is reduced in diameter near its end, as shown at 2, to receive a thrust collar 3, of any suitable size and construction, keyed to the shaft at 4 and retained against the shoulder on the shaft by a nut 5 on the threaded portion 6 at the end of the shaft. Cooperating with one or both faces of the thrust collar 3 are thrust bearing elements 7 of any suitable character and construction and mounted in any suitable way. As here shown, said thrust bearing elements 7 take the form of tiltably mounted shoes having spherical rear surfaces in engagement with equalizer plates 8 carried in rings 9 that are suitably positioned by filler plates 10, but it is to be expressly understood that any other suitable form of thrust bearing elements and any other suitable form of mounting means therefor may be employed with equal facility so far as the present invention is concerned as the construction of the thrust bearing per se constitutes no part of the present invention.

Also associated with the shaft 1 adjacent the thrust bearing is a journal or guide bearing 11 of any suitable construction and mounted in any suitable way, the form here shown being of the self-aligning type. In this embodiment the thrust and journal bearings are provided with a common housing 12 which may be constructed in halves, as shown in Fig. 2, to facilitate the assembly and disassembly of parts.

Below the thrust bearing is an oil well 13, here shown as formed integrally with the lower half of the bearing housing, although if preferred the oil well chamber could be separately formed and suitably attached to the bearing housing, or the oil reservoir may be positioned more or less remote from the thrust bearing chamber and communicate therewith through passages or pipes leading to the inlets of the lubricating device to be described. As illustrated in Fig. 2, a generally semicircular wall 14 separates the oil well 13 from the chamber containing the thrust collar and thrust bearing elements.

The upper half of the bearing housing is provided with a semicircular recess 15 opposite the periphery of the thrust collar, said recess being larger than the thrust collar both radially and axially of the collar. The lower half of the bearing housing is similarly provided with a semicircular recess 16 of greater radial depth than the recess 15 but preferably of substantially the same axial width as the thrust collar for a reason that will hereinafter appear. Mounted on the periphery of the thrust collar is a lubricating ring 17 which is channel-shaped in cross section, as shown in Fig. 1, so as to provide a confined annular passage 18 between the periphery of the thrust collar and the inner walls of the channel of said ring. Said ring may be formed in one piece or in sections suitably connected, and it has a running fit with the periphery of the thrust collar, the clearance being on the order of a few thousandths of an inch.

The lubricating ring 17 is provided with an enlargement 19 which fits the recess 16 in an axial direction and which has axially directed passages 20 and 21, preferably leading from both of the lateral surfaces of the enlargement so that the axial pressures thereon are balanced, one of said passages 20 communicating with one end of the annular passage 18 and the other passage 21 communicating with the opposite end of said passage 18, as shown in Fig. 2. Between said passages 20 and 21 is a solid wall 22 curved at its inner edge to conform with the periphery of the collar and designed to ride on the periphery of said collar, so as to constitute a dam or partition between the ends of the annular passage 18 in communication with the axial passages 20 and 21.

Disposed in the wall 14 adjacent the lowermost part thereof are three spaced passages 23, 24 and 25. The passages in the partition 14 are preferably duplicated at each side of the recess 16, as illustrated, although, if desired, the passages in the partition 14 could be disposed on one side only of the recess 16, although the passages 20 and 21 would still preferably extend to both faces of the ring in order that the pressures may be balanced.

Figure 3:
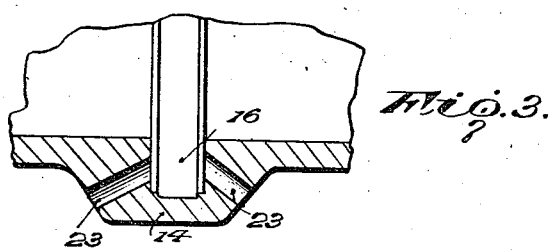
Fig. 3 is a fragmentary section through one of the inlet ports of the lubricating device.

As illustrated more in detail in Fig. 3, the passages 23 and 25 extend diagonally outward and downward from the recess 16 and open into the oil well below the surface of the oil therein, so that each pair of passages 23 and 25 forms a duplex admission port for oil from the oil well to the recess 16. The intermediate pair of passages 24, however, extends outwardly and upwardly from the recess 16 to the inner surface of the thrust bearing chambers, as shown in Fig. 1, so that said passages constitute outlet ports from the recess 16 to the thrust bearing chambers. The center to center distance between the passages 23, 24 and 25 is the same as the center to center distance between the passages 20 and 21.

The enlargement 19 on the lubricating ring 17 also extends circumferentially on either side of its central portion containing the passages 20 and 21, as illustrated at 26 and 27 (see particularly Fig. 4), said extensions 26 and 27 being of sufficient length to constitute valves for closing one or the other of the pairs of passages 23 and 25 when the other of said passages is in communication with one of the pairs of passages 20 and 21. In the position of parts shown in Fig. 2, the extensions 26 are closing the ends of the passages 23, but when the ring 17 is moved so that the passage 20 registers with the passage 23 and passage 21 registers with the passage 24, extensions 27 close the passages 25.

Lubricating ring 17 is so mounted that it may be moved circumferentially with the thrust collar by an amount equal to the center to center spacing between the passages 20 and 21. In the form shown in Fig. 2 the ring 17 is provided with a pair of lugs 28 and 29 and the recess 15 is provided with a pair of lugs 30 and 31—here shown as formed integrally with the bearing housing, although said lugs 30 and 31 could be formed by the ends of inwardly projecting screws if desired. The distance between the remote faces of the lugs 28 and 29 is less than the distance between the opposed faces of the lugs 30 and 31 by an amount equal to the center to center spacing of the passages 20 and 21.

With the parts in the position shown in Fig. 2, wherein the passages 20 in the ring 17 are in register with the passages 24 in partition 14 and the passages 21 in the ring 17 are in register with the passages 25 in the partition 14, oil may flow from the oil well 13 through the passages 25 and 21 and into the annular passage 18 between the periphery of the thrust collar and the inner surface of the ring 17, and may flow out of said passage through the passages 20 and 24, and into the thrust bearing chambers. This is suitable for anticlockwise rotation of the shaft 1 as viewed in Fig. 2. Should the shaft 1 rotate in a clockwise direction, as viewed in Fig. 2, there is sufficient friction between the ring 17 and the periphery of the thrust collar so that the ring would first tend to move with the thrust collar, removing the stop lug 28 from contact with its lug 30 and engaging the stop lug 29 with its lug 31. In this position the passages 20 in the ring 17 register with the passages 23 in the partition 14, and the passages 21 in the ring 17 register with passages 24 in the partition 14, and now oil may flow from the oil well through the passages 23 and 20 into annular passage 18 and out through the passages 20 and 24 into the thrust bearing chambers, which is suitable for this direction of rotation of the shaft 1 as viewed in Fig. 2.

Owing to the radially narrow chamber between the rotating peripheral surface of the thrust collar and the relatively stationary inner surface of the lubricating ring, and the passages heretofore described with the dam 22 separating the inlet and the outlet of said passage 18, the periphery of the thrust collar operates as a rotary pump, sucking oil into the chamber 18 through the inlet passages 23 or 25, depending upon the direction of rotation, and forcing the oil through the passages 24 into the thrust bearing chambers. Depending upon the speed of rotation and the size of the passages and parts, oil may thus be pumped from the oil well 13 into the thrust bearing chambers in copious quantities and under considerable pressure.

The lower portion of the ring 17 is always submerged in oil and therefore the passages 20, 21, 23, 24 and 25 are always primed with oil when rotation of the shaft is started.

The dam 22 rides on a film of oil adhering to the periphery of the thrust collar and tends to form a wedge-shaped oil film between the inner peripheral surface of the dam and the periphery of the collar, thereby tending to tilt the ring eccentrically to the collar and reducing the clearance between the lateral flanges of the ring and the periphery of the collar on one side of the collar. This will result in the wear of the ring, or the collar, or both, and to avoid this result, the ring 17 is preferably provided with one or more members disposed in balanced relation to the dam 22 and adapted to ride on the periphery of the collar at spaced points around the same. In the embodiment shown in Fig. 2, three of such shoes 32 are shown, one diametrically opposite the dam 22 and one on each side of the dam 22 at 90° therefrom, so that the ring is engaged with the periphery of the thrust collar at four points spaced 90° apart. If preferred a smaller or larger number of shoes could be used so long as they tend to balance the pressure of the oil on the ring.

Said shoes 32 may be tiltably mounted on the lubricating ring, by pivoting them in the lateral flanges thereof, but for simplicity it is preferred that they be formed integrally with or suitably attached to the ring, being shown as formed as bridges between the lateral flanges of the ring. In either event the shoes are preferably brought to a sharp edge at each extremity as shown, so as to minimize loss of efficiency in deflecting the oil over the shoes and through the passages between the shoes and the outer wall of the ring, although the ends of the shoes may be squared or otherwise shaped if for any reason this is preferred. As shown, the ring 17 is provided with enlargements at the rear of each of the shoes so that the passage between the shoe and the ring shall not constitute a constriction with respect to the normal radial width of the annular passage 18.

The oil flowing into the thrust bearing chamber is first caused to flow radially inward through passages 33 formed in the rings 9, whence it flows axially toward the thrust collar through the annular passage 34 between the periphery of the shaft and the inner periphery of the rings 9 and stationary bearing elements 7. Thence the oil flows radially outward between the thrust bearing shoes 7, or through oil growing provided in the stationary thrust bearing element, as the case may be, wetting and lubricating the thrust bearing surfaces. The oil escaping from the periphery of the thrust bearing elements may flow around and outside of the lubricating ring 17, through the annular passage 35, and thence be returned to the oil well through suitable passages 36 and 37 formed in the walls of the bearing housing or formed exteriorly thereof. The oil well is so formed and is of sufficient capacity so that when all of the passages and chambers supplied with oil by the pumping action of the thrust collar are completely full, the level of the oil in the well will not drop below the inlet ends of the passages 23 and 25. If preferred the return passages 36 and 37 may lead to the bottom of the oil well to assure that the hot oil will not return immediately to the lubricating ring, whether or not a cooling coil is used in the well.

The oil pumped to the thrust bearing chambers by the pumping action of the thrust collar, as heretofore described, may also be employed to lubricate one or more journal bearings situated contiguous to or more or less remote from the thrust bearing. In the form shown in Figs. 1 to 4 the steady bearing 11 mounted within the same housing as the thrust bearing is supplied with oil from the thrust bearing chambers through passages 38, 39 and 40. If the journal bearing is separate from the thrust bearing or remote therefrom, the oil may be led thereto through a pipe communicating with the thrust bearing chambers, as through the passage 39 and a pipe communicating with the opening shown closed by the plug 41. If desired, passages 38 may lead from the chambers at both sides of the thrust collar, but it is preferred to take the oil from that side of the thrust collar which carries the minimum load under normal operation. For example, in the embodiment of Fig. 1, if the thrust is normally sustained by the thrust bearing elements at the right-hand side of the thrust collar and only in event of reversal of the shaft does the thrust bearing at the left of the collar sustain a heavy load, the oil can be withdrawn from the chamber at the left of the thrust collar with the minimum danger of interfering with the proper lubrication of the thrust bearing surfaces which are sustaining the load. As shown, the passage 40 may be formed in a flexible or universally tiltable tube 42 so that when the journal bearing is self-aligning there is no interference with the self-aligning function thereof.

The thrust bearing chambers are separated from the steady bearing chamber by a seal ring 43 so that oil may not flow directly into the steady bearing chamber from the thrust bearing chambers, and interfere with the prompt filling of the thrust bearing chambers. The oil flowing through the steady bearing is suitably collected in the housing of the steady bearing as shown at 44 and may return to the oil well through any suitable passage or passages, such as shown at 44'. At the opposite end of the embodiment shown in Fig. 1 the thrust bearing chambers are sealed by the filler plate 10. Hence the thrust bearing elements are enclosed in relatively oil tight chambers that may be promptly filled by the pumping action of the thrust collar when provided with a lubricating device of the type heretofore described. With these chambers filled the pump ring is entirely submerged in oil and therefore the likelihood of air being drawn into the oil between the surfaces of the collar and the lubricating ring is minimized.

The foregoing construction is particularly adapted for high speed service, as for example in thrust bearings for high speed pumps, wherein the shaft comes to full speed promptly and comes to a stop promptly. In other types of service, however, for example in hydroelectric service, where the shaft speed is more moderate and the building up and reduction of speed is more gradual, it may be desirable to deliver oil to a journal or steady bearing more promptly than can be obtained in a construction wherein the thrust bearing chambers must first be completely filled, at the lower capacity of the lubricating ring incident to the lower speed of the thrust collar, before oil can flow to the journal bearing.

Figure 5:
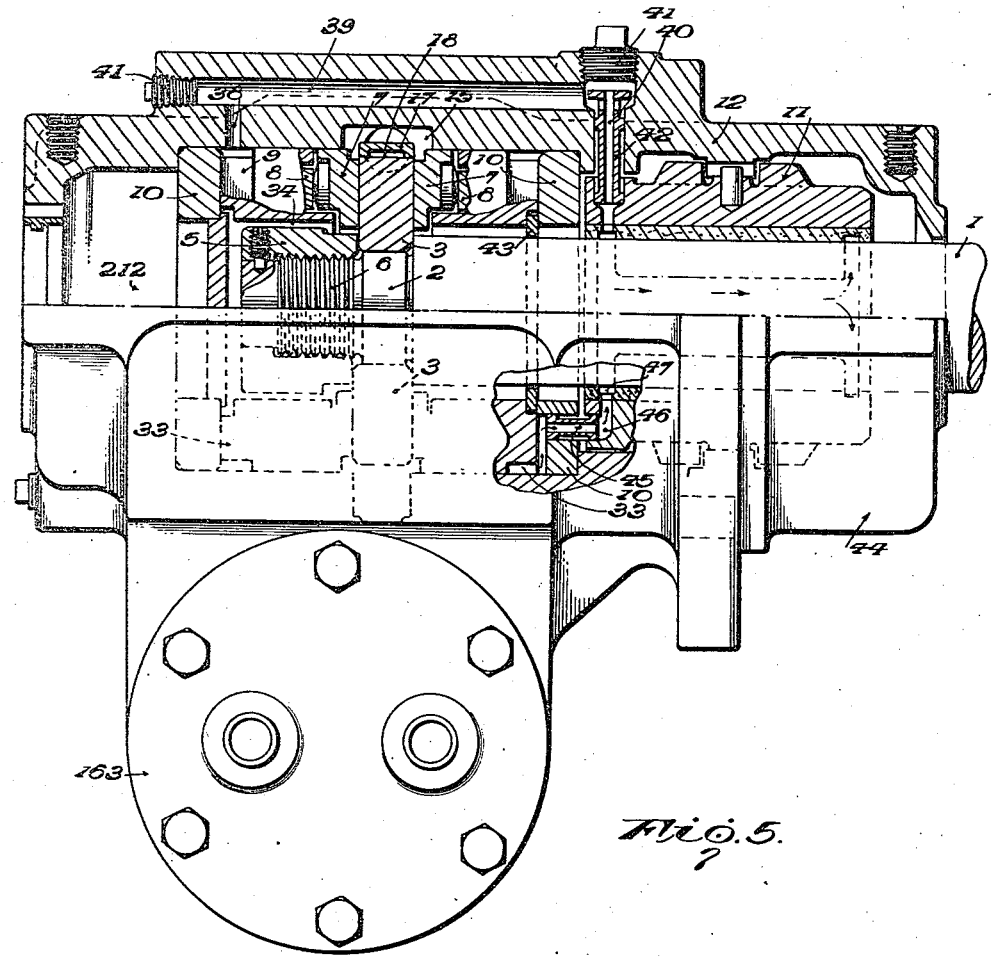
Fig. 5 is an axial section generally corresponding to Fig. 1 but illustrating a slightly different lubricating ring and provision for supplying oil directly to the journal bearing from one of the thrust bearing chambers, which latter provision may be used either in conjunction with or in place of the passages shown in Fig. 1 for leading oil from the thrust bearing chambers to the journal bearing.

In the embodiment of Figs. 5 and 6 provision is made for pumping oil to the journal bearing promptly after the shaft starts in rotation. Although, as in the embodiment heretofore described, the journal bearing chamber is separated from the thrust bearing chamber by a seal ring 43, where the two bearings are closely associated within a common housing, the filler ring 10 is provided with a passage 45 which communicates with the heretofore described passage 33 at its inlet end and leads to a passage 46 that communicates at its outlet end with the inlet oil groove 47 of the journal bearing. If desired the passage 45 may be provided in a flexible or universally mounted tube as shown. As the oil rises in the thrust bearing chamber at the right of the thrust collar, as viewed in Fig. 5, it will flow through the passages 45 and 46 to the journal bearing and thereby furnish adequate lubrication for the journal bearing before the thrust bearing chambers are filled with oil. The passages 45 and 46 may be used in conjunction with the passages 38, 39 and 40 as illustrated in Fig. 5, or one or more sets of passages 45 and 46 may be used in place of the passages 38, 39 and 40. For example, two sets of passages 45 and 46 may be employed, one as illustrated in Fig. 5 and another of like construction disposed at 180° from that shown in Fig. 5, whereby there are two conduits between the thrust bearing chamber and the journal bearing chamber, assuring that the journal bearing is always properly supplied with lubricant even though one of said passages may become inactive for one reason or another.

While as heretofore described the lubricating ring is particularly designed and adapted to be automatic in its operation so as to automatically assume the proper position for either direction of shaft rotation, this lubricating ring is of particular advantage even when applied to shafts intended to rotate only in one direction, because the construction employed is such that the lubricating device can be standardized and there is no need for making it in "rights" or "lefts", depending upon the direction of shaft rotation. While the lubricating device will remain in its proper position for either direction of shaft rotation, it may be desirable, for one reason or another, to lock the lubricating ring against displacement from its proper position for a designed direction of shaft rotation. In the embodiment shown in Fig. 7 the upper half of the bearing housing is provided with a threaded aperture 50 in communication with the recess 15, and receives a cap screw 51 having an inwardly projecting end 52 of such width circumferentially that it may lock the lug 29 in either of two positions, in one of which the lugs 28 and 30 are in engagement, as shown by full lines in Fig. 7, which is the proper position for anti-clockwise rotation of the shaft as viewed in that figure, and in the other of which the lug 29 is in engagement with the lug 31, as shown in dotted lines in Fig. 7, which is the proper position for clockwise rotation of the shaft as viewed in said figure.

The embodiment of Fig. 7 possesses the additional advantage that the cap screw 51 may be of sufficient size so that when removed it affords an inspection hole for observing the freedom of action of the lubricating ring. Also, by omitting the inwardly projecting end of the cap screw 51, such inspection hole can be provided in any of the other embodiments of this invention without interfering with the automatic movement of the lubricating ring with changes in the direction of shaft rotation.

The embodiment of Fig. 7 illustrates another feature which may be incorporated to prevent the lubricating ring from being improperly associated with the thrust collar, so as to render it inoperative—as would be the case, for example, if the ring were so mounted on the thrust collar that the lug 28 is below rather than above the lug 30 as viewed in Fig. 7. To this end the lubricating ring may be provided with one or more outwardly projecting lugs 53 and 54 of such radial depth that they can not enter the recess 15, but are suitably received as shown in the recess 16. When lugs 53 and 54 are employed, they must be so located as not to interfere with the proper circumferential movement of the lubricating ring within the limits heretofore described. If preferred, only one of said lugs need be employed, or if two of such lugs are employed, they may be so positioned as to cooperate with the ends of the recess 16 to supplement the action of the stop lugs 28, 30 and 29, 31 in positioning the lubricating ring for one or the other direction of shaft rotation.

While it is preferred to provide the lubricating ring with suitably positioned shoes to prevent wear of the parts under the tilting action of the oil film thereon, in some cases a simpler form of lubricating ring may be employed as shown in the embodiment of Figs. 8 and 9, and also Fig. 5. As here shown, the lubricating ring is of the same construction as heretofore described in conjunction with the embodiment of Figs. 1 to 4 except that no shoes 32 are employed. This enables the lubricating ring to be made of simple channel formation throughout and this construction not only has the advantage of simplicity of ring construction, but its efficiency is increased by the absence of the obstructions afforded by the shoes in the channel. The lugs 28, 30 and 29, 31 in this construction are preferably so positioned that when the ring is in either of its positions the operating lugs react to balance as far as possible the pressures developed by gravity, friction and oil pressures within and without the ring. This embodiment also illustrates the supplemental lugs 53 and 54 for preventing improper assembly of the ring with the collar.

While it is preferred to provide a lubricating ring that is equally available for either direction of shaft rotation, and one that automatically positions itself properly for either direction of shaft rotation, the present invention, in its broader aspects, contemplates the use of a lubricating ring mounted on the periphery of a thrust collar and utilizing substantially the entire peripheral surface of the thrust collar as a pump surface although the ring is designed for only one direction of shaft rotation, although all of the advantages of the present invention cannot thereby be obtained. In its simplest form a channel shaped ring may be mounted on the periphery of a thrust collar and provided with a dam adjacent the lowest point thereof, and with a pipe or other suitable passage leading downwardly adjacent the dam from the annular chamber within said ring, with an outlet opening or openings from said annular chamber on the other side of said dam, whereby oil may flow from the oil well through said pipe connection, into and through the annular passage embracing the major portion of the periphery of the thrust collar, and then out through the openings provided at the opposite side of the dam from the inlet pipe.

A structure of the type just referred to but additionally providing passages for leading oil to two diametrically disposed points with respect to the collar is illustrated in Figs. 10 and 11. As here shown, the lubricating ring 60 is of greater axial width than those heretofore described, being designed for cooperation with a thrust collar of greater width than illustrated in the embodiments heretofore described. Ring 60 is provided with inwardly directed lateral flanges 61 and 62, and with inwardly directed intermediate flanges 63 and 64 which correspond with the lateral flanges of the lubricating rings heretofore described. If the thrust collar employed is of a width corresponding with the preceding embodiments, the flanges 61 and 62 would be omitted and the ring be made of the width of the thrust collar, the ring being of the width illustrated in Fig. 9, for example. The chamber between the periphery of the collar and the ring 60, between the flanges 63 and 64, constitutes an annular pump passage which functions in the same manner as heretofore described in connection with the annular passage 18. The annular passages between the flanges 61 and 63, on the one hand, and the flanges 62 and 64, on the other hand, provide for collecting and retaining the oil that would otherwise be thrown outwardly by the marginal portions of the periphery of the thrust collar if confining chambers were not employed. These last referred to passages also constitute sealing grooves for the annular pump passage between the flanges 63 and 64, this application as to this embodiment being a continuation in part of my prior application Serial No. 317,001 filed November 3, 1928.

In this embodiment, which is shown as suitable for anticlockwise rotation of the shaft as viewed in Fig. 10, the oil may flow into the annular passage 65, between the flanges 63 and 64, through a depending tubular extension 66. Adjacent said inlet passage 66, on one side thereof, is a dam 67, and communicating with the opposite end of the annular passage 65 from the inlet 66 are outlet passages 68, one of these passages communicating with a peripherally-extending passage 69 formed circumferentially on the lower half of the ring 60 and leading to a laterally-directed outlet opening 70, and the other of said outlet passages communicating with a peripherally-extending passage 71 also formed circumferentially on the lower half of said ring and leading to a laterally-directed outlet opening 72. The oil flowing through the inlet 66 will be pumped through the annular passage 65 by the rotary action of the periphery of the thrust collar and delivered through the outlet passages 68, part of it flowing through the passage 69 and part through the passage 71, whence it is delivered through the openings 70 and 72, and from here the oil may flow into the chambers of a double acting thrust bearing, or one may supply a thrust bearing chamber and another supply a journal bearing, or both may communicate with passages leading to journal bearings, etc. By relatively reversing the construction shown in Fig. 10, the lubricating ring would be suitable for a shaft having a clockwise direction of rotation as viewed in said figure.

The embodiment of Fig. 10 also illustrates the use of springs 73, which may be used under one or both of the side lugs 74 of the lubricating ring, said springs being of such strength as not only to carry the weight of the lubricating ring so that it may float on the periphery of the collar, but also to balance the pressures created by the rotative torque of the collar on the ring owing to friction and the oil pressures developed within the ring by its pumping action. These springs may also be supplemented if desired by laterally directed springs or a single spring may be so mounted at one or both sides that its angle of reaction is such as to balance the resultant on the ring of the oil pressures within the ring, and thereby prevent wear of the parts without the use of the bridges heretofore described.

While it is preferred to embody the present invention in lubricating rings which utilize substantially the full peripheral surface of the collar for developing pressure in the oil, it is sometimes unnecessary to develop as much pressure as is available by using the full peripheral surface of the collar, and the present invention, in its broader aspects, contemplates the use of a channel-shaped lubricating ring of the character described mounted upon the periphery of the collar and having automatic valve mechanism adjustable in conformity with the direction of rotation of the shaft, for pumping oil to the thrust bearing members or to one or more journal bearings, etc., although only part of the periphery of the collar is used at any one time as a pumping surface.

Fig. 12 illustrates an embodiment of the present invention wherein a channel-shaped lubricating ring is mounted on the periphery of the thrust collar and provided with automatic valve mechanism of the type disclosed in my Patent No. 1,496,849 heretofore referred to, more particularly Fig. 4 thereof. The embodiment here illustrated corresponds generally with the embodiment of Fig. 2 except that the channel-shaped lubricating ring 75 is provided adjacent its lowermost point with an inlet connection 76 which communicates at its lower end with the oil well and at its upper end with the annular passage 77 within the ring on both sides of the inlet. Adjacent the top of the ring 75 said ring carries a valve member 78 provided with a circumferentially extending aperture 79 through which extends a fixed lug or bridge piece 80 on the ring 75. The aperture 79 is of sufficient length so that the valve member 78 may move into engagement with either one or the other extremity of the peripherally-extending outlet aperture 81 in the top of the ring 75.

In the position of parts shown in Fig. 12, oil may enter the annular chamber 77 through the inlet pipe 76, and with the shaft rotating in an anticlockwise direction as viewed in Fig. 12, the valve member 78 is held against the left-hand edge of the aperture 81, closing off that portion of the annular passage which lies on the left of the valve member 78. The oil pumped upwardly through the annular chamber 77 may flow outwardly through the aperture 81 and be led to and through the thrust bearing chambers, and also to one or more journal bearings if desired, and then be returned to the oil well 13, as for example through the passages 36 and 37 described in conjunction with the embodiment of Figs. 1 and 2. If the shaft rotates in a clockwise direction as viewed in Fig. 12, the valve member 78 will move with the thrust collar until it reaches the right-hand extremity of the aperture 81, in which position the left-hand half of the annular passage 77 becomes effective in pumping oil from the oil well to and through the bearing chambers. This embodiment possesses the disadvantage that only one half of the peripheral surface of the collar is ever utilized at any one time in developing pressure in the oil when pumped thereby, but this embodiment retains the advantage of prior embodiments in that the automatic valve mechanism is unitarily associated with a readily mountable and demountable channel-shaped ring that can be standardized as to sizes and readily installed on any suitable collar.

In the embodiments heretofore described the invention has been shown as applied to a thrust collar and the lubricating device as pumping oil to one or more journal bearings disposed adjacent to the thrust bearing or more or less remote therefrom, although obviously the pumped oil may be utilized only for lubricating a thrust bearing. In the embodiment of Figs. 13 and 14 the invention is shown as applied to the lubrication of a journal bearing per se. The journal bearing 85 may be of any suitable construction and provided with oil grooves of any suitable character and arrangement. As shown, there is an inlet oil groove 86 at one extremity of the journal brasses and an outlet oil groove 87 at the opposite extremity thereof. Mounted on the shaft adjacent the inlet end of the oil grooves is a collar 88 of any suitable size and construction, and on said collar is a channel-shaped lubricating ring 89 of the type heretofore described, and made in one piece or in halves suitably joined, as preferred. In this embodiment the journal bearing sleeve is provided with passages 90 and 91 leading to opposite sides of the shaft, so as to introduce oil into the inlet groove 86 at the proper point for either direction of shaft rotation. Said passages 90 and 91 communicate with a common inlet passage 92 and, as in previously described embodiments, the lubricating ring has two apertures 93 and 94 for registering with the passage 92 and either one of two passages 95 and 96 in a plate 97 which closes the chamber 98 in which the collar and ring operate—said chamber being of substantially the same axial width as said collar and ring. As in the previously described embodiments, the lubricating ring operates as a valve for closing one or the other of the passages 95 or 96, and depending upon the direction of shaft rotation the lubricating ring draws oil from an oil well through one or the other of the apertures 95 or 96, develops pressure therein in the annular chamber between the periphery of the thrust collar and the lubricating ring 89, and delivers the oil through the passage 92 to the passages 90 and 91, whence it flows to the inlet groove 86 of the bearing brasses. This lubricating ring may also be provided with bridges or springs to prevent wear, if desired.

In the embodiment of Figs. 13 and 14, the collar is shown as made in halves dowelled together, and attached to the shaft by bolts 99 which are provided with springs 100 between the nuts 101 and the bottom of the bolt receiving recesses, so that the collar is gripped frictionally but yieldingly to the shaft, whereby the shaft may move axially within the collar, without injuring any of the parts, if end-play of the shaft is to be cared for. Any other suitable manner of attaching the collar to the shaft may be employed, however, and if end-play is not a factor, the collar may be made integral with or rigidly attached to the shaft.

Figs. 15 and 16 illustrate another embodiment of the present invention wherein the lubricating ring is associated with a journal bearing for pumping a lubricant thereto. In this embodiment the shaft 105 carries a collar 106 which is keyed thereto in any suitable way, being shown as having a free fit on the shaft and rotatably attached thereto by a pin 107 projecting radially from the shaft into an axially extending slot 108 in the hub of the collar. To retain the collar on the shaft, straps 109 are attached to stationary parts of the bearing structure in position to overlie a segment of the combined collar and lubricating device.

In this embodiment the channel-shaped lubricating ring 110 embraces the collar 106 so that the lateral as well as the peripheral surfaces thereof constitute pumping surfaces, and has its lateral walls terminating in annular portions 111 which have bearing engagement with the hub of the collar 106 on either side of the intermediate disk-like portion 112 thereof. The portion 112 of the collar therefore rotates within a confined annular chamber 113 and constitutes a rotary pump operating in the manner heretofore described.

As in prior embodiments, the lubricating ring is provided with a pair of apertures 114 and 115 and an interposed dam 116 which engages the periphery and lateral faces of the collar, whereby the lubricant will be pumped through one of said apertures, depending upon the direction of shaft rotation, and delivered through the other of said apertures, utilizing substantially the entire peripheral surface of the collar as well as the lateral faces thereof as pumping elements. The aperture in the lubricating ring through which the oil flows out of the ring registers with an aperture 117 in a wall extending between the sleeve 118 of the journal bearing and the housing 119, and the oil delivered into the aperture 117 flows through passage 120 to the inlet groove 121 of the journal bearing brasses. From oil seal groove 121 at the left end of the bearing the oil passes through suitable channels to a similar groove 121' at the opposite end. The latter groove discharges its oil through constricted passages 122 that lead into the oil reservoir, thereby providing an oil circulation. Any oil escaping from groove 121' is collected in a groove 122' and returns to the oil well or reservoir through a suitable passage 123. As in prior embodiments, cooperating stops 124 are provided on the ring and surrounding casing, so that the ring may move with the collar through a limited distance when there is a change in the direction of shaft rotation, to reposition the apertures in the lubricating ring in accordance with the principles heretofore described. It will be understood that an apertured stationary member, which may be the lower strap 109, cooperates with the lower portion of the lubricating ring to open communication between the oil reservoir 125 and the ring aperture 114 or 115 which is to constitute the inlet to the ring, simultaneously closing communication between the reservoir and the other aperture, as the lubricating ring moves from one position to the other, depending upon the direction of shaft rotation, in the manner heretofore described. The lubricating ring of this embodiment is shown as made in halves suitably clamped together by screws or bolts, a construction which may be employed with any of the other embodiments of this invention.

In the embodiments so far described, the present invention has been illustrated in conjunction with horizontal shafts, but the invention is also available for lubricating bearings associated with inclined shafts and vertical shafts. In the case of lubricating devices associated with vertical shafts, the lubricating ring may cooperate with only the periphery of the rotating collar, as in the embodiments first described, in which event radial projections may be provided on the lubricating ring for cooperation with the upper face of the collar to properly position and support the ring or the lubricating ring may be of the form shown in Figs. 15 and 16 wherein it embraces the lateral faces of the collar so that the lateral faces as well as the peripheral surface of the collar act as pumping elements. The rotating collar used may be a thrust collar, or it may be a collar applied directly to the shaft with which are associated the bearings to be lubricated, or the collar may be applied to a separate shaft, which may be either vertical, horizontal or inclined, to provide an external oil circulating pump for withdrawing oil from any suitable well or reservoir, pumping it through the bearing or bearings to be lubricated, and through any suitable cooling device if desired, and then returning the same to the well or reservoir.

In the embodiment shown in Fig. 17 the invention is shown applied to a thrust collar and utilizes only the peripheral surface thereof as a pumping surface, while in the embodiment shown in Figs. 18 and 19a the invention is shown applied to a separate collar with the lubricating ring embracing the sides as well as the peripheral edge of the collar.

In Fig. 17, the collar 130 on the shaft 131 is a thrust collar of any suitable size and construction, and cooperating therewith, on one or both sides thereof are stationary thrust bearing elements which may be of any suitable type and construction but illustrated as tiltably mounted bearing shoes 132. The lubricating ring 133, which is of channel-shaped cross section as in embodiments previously described, carries a plurality of inwardly directed projections 134 which are adapted to engage the upper surface of the collar and thereby position and support the lubricating ring. Where the lubricating ring is automatically positioned upon change in direction of shaft rotation and the stationary bearing elements cooperate with the upper surface of the collar, sufficient space must be left between the stationary bearing elements where the extensions 134 engage the collar to permit of the requisite movement of the lubricating ring with respect to the collar. Where the collar can project radially beyond the bearing elements, the lubricating ring can embrace the edge of the collar and be supported and positioned by the engagement of the inner edge of the upper lateral wall of the channel-shaped ring with the upper surface of the collar.

In the embodiment of Fig. 17 the lubricating ring carries unitarily therewith conduit sections 135 and 136 which extend downwardly and then inwardly to an automatic valve construction 137 which may be of the type illustrated in detail in Fig. 19b hereinafter described.

In the form shown in Figs. 18, 19a, 19b, the shaft 140, which is shown as vertical but may equally well have any other direction and which may be the shaft with which the bearings are associated or a separate shaft geared to said shaft or driven by its own motor, carries a collar 141 which, as in the embodiment of Figs. 15 and 16, takes the form of an elongated hub 142, suitably keyed or otherwise attached to the shaft to rotate therewith, and an intermediate disk-like portion 143. The channel-shaped lubricating ring 144 embraces the lateral faces as well as the periphery of the disk 143 and has enlargements 145 at the inner edge of each of its lateral faces for bearing engagement with the hub 142, and also supporting engagement with the inner periphery of the disk-like portion 143.

As here shown the lubricating ring is duplex in action, and formed unitarily therewith are two pairs of downwardly and then inwardly directed passages 146, 147 and 148, 149, the pairs of passages being diametrically disposed with respect to each other. Said passages at their upper ends communicate with two pairs of diametrically opposite apertures 150 formed in the circumferential wall of the lubricating ring, and dams 150' are carried by the ring between the openings of each pair as in embodiments previously described. As these dams are diametrically opposite, the pressure of the oil on the ring is balanced thereby. If desired one or more bridges, as in previously described embodiments, may be provided on the ring, especially where the ring is not duplex in action, so as to prevent wear of the parts. At their lower ends said passages terminate in concentric adjacent relationship, as shown in Fig. 19b for registry with openings in a tubular member 151 which is suitably supported from and extends upwardly from the base 152 of the housing 153 of the oil well. Said tubular element 151 has a pair of diametrically disposed openings 154 and 155, constituting inlets thereto, and in the form shown, the shaft 140 extends downwardly beyond the thrust collar and projects axially into the tubular member 151, being provided with a journal bearing 156 therein, but leaving an annular passage 157 between the shell of said bearing and the inner wall of said member 151. This annular passage constitutes the outlet passage and may communicate in any suitable way with the chamber or chambers to which the lubricant is to be pumped, being shown as communicating with an outlet pipe 158 which extends downwardly from the base of the well.

Where the lubricating device is motor driven to afford a separate circulating pump, the shaft may always rotate in the same direction, and no provision need be made for change in direction of the rotation of the shaft. Where the lubricating device is associated with or driven by a shaft the direction of whose rotation may change, provision may be made, as in the embodiments previously described, whereby the lubricating device will move with the collar through a limited arc, upon change in the direction of shaft rotation, so as to automatically position the inlet and outlet passages appropriately for the then direction of rotation of the shaft and collar, thereby providing an automatic valve mechanism as in previous constructions. Any suitable stops may be provided on the lubricating ring and stationary parts of the supporting structure to limit the rotation of the lubricating device with the collar, one such stop being indicated at 159.

In the embodiment shown in Figs. 18, 19a, and 19b, wherein the shaft is shown as rotating in a clockwise direction, the oil is drawn through the passages 146 and 149 and the corresponding 150 opposed apertures 150 into the annular chamber between the lubricating ring and the collar, and forced therefrom through the passages 147, 148 and 154, 155 into the tubular member 151, whence the oil flows out of the lubricating device through the outlet 158. When the direction of shaft rotation is reversed, the lubricating device moves with the collar until stopped by the suitably positioned limiting stop, in which position the passages 147 and 148 become the inlets and the passages 146 and 149 are in register with the passages 154 and 155 in the tubular member 151.

As shown, the lubricating device is also provided with an annular upstanding collar 160 apertured at 161 to permit oil to flow therethrough, said collar projecting above the level of the oil in the well 153 to prevent churning of the surface of the oil therein. The oil may be returned from the bearing chambers, with or without the interposition of a suitable oil cooler, through the pipe indicated at 162.

The pressure developed by the lubricating rings heretofore described, whether used with a thrust collar or with a collar associated with a journal bearing, is sufficient to cause the oil to circulate through an external oil cooler when external cooling means are preferred, as well as through an air cooled or water cooled oil well or reservoir of any suitable character. In accordance with one feature of the present invention, in order to take advantage of this capacity for circulation of the oil through a cooler, the oil well of the bearing is provided with a self-contained cooling device which is unitarily associated with the bearing structure, so that it can be furnished, if desired, by the bearing manufacturer, and have the size and capacity which is suitable for the particular size and speed of bearing equipped with a lubricating device of the type heretofore described. Such self-contained cooling equipment adds little to the volume of space occupied by the bearing structure and affords a highly efficient lubricating system which includes its own cooling equipment.

In the embodiment of Figs. 1 and 2, the oil well takes the form of a generally cylindrical casing 162 closed at its ends by cover plates 163 and 164, one of which may be provided with a filling passage 165. A drain passage is shown at 167. The apertures closed by the plates 163 and 164 are adapted to receive the ends of a cylindrical cooler casing 168 which is preferably made of sheet metal, although any other suitable material may be used. The cooling device, composed of water tubes 169 and baffles 170, can be formed as a unit and furnished by the bearing manufacturer or separately furnished for insertion in the casing 168. The wall of the housing engages the casing at one end as shown at 171, leaving an annular passage 172 through which the passages 36 and 37, that return oil from the bearings, communicate with the interior of the cooler casing 168, as through a suitable number of inlet apertures 173. The opposite end of the casing 168 has outlet apertures 174 by which the cooled oil returns to the oil well for recirculation through the bearings.

The cooling water may be led to and from the tubes 169 by any suitable connections. In the embodiment of Figs. 20 and 21 the tubes 169 are shown mounted at one end in a header 175 which has on one face thereof a chamber 176 across which extends a diametrical partition 177. Inlet and outlet connections 178 and 179 communicate with the chamber 176 at opposite sides of the partition 177 so that the inflowing water traverses the entire length of the cooling device through one-half of the tubes, in one direction, and then the other half of the tubes, in the other direction, a suitable header 180 being provided at the opposite end of the tubes as illustrated.

It is sometimes desirable to filter the oil as it returns from the bearing chambers, and where a filter is employed, it is desirable to be able to clean the filter without interrupting the operation of the bearing. In the embodiment of Figs. 22 to 24 a duplex filter is illustrated which may be applied to any of the foregoing embodiments, although it is also of general application to other forms of bearings. With this device the oil may be directed through either of two filtering devices, and the inactive filter may be removed and cleaned without interrupting the operation of the bearing. In the construction as illustrated, a filter housing 185 is provided with a central cylindrical wall 186 and chambers 187 and 188 on either side thereof. Each of the chambers 187 and 188 is closed by a removable cover plate 189 and beneath said cover plate, and suspended therein in any suitable way, is a cup-shaped strainer 190, shown as mounted by means of flange 191 on a ledge 192 within the corresponding chamber.

Mounted within the cylindrical wall 186 is a rotary valve 193 having an inlet passage 194 extending partway around the periphery thereof at one end of the valve member and an outlet passage 195 formed partway around the valve member adjacent the opposite end thereof. In horizontal alignment with the inlet passage 194 are passages 196 and 197 in cylindrical wall 186, and in horizontal alignment with the outlet passage 195 are outlet passages 198 and 199 in the cylindrical wall 186. Also extending through the cylindrical wall 186 in the horizontal plane of the valve passage 194 is an inlet passage 200 which communicates with the passages leading from the bearing chambers, as the passages 36 and 37 of Fig. 1. Leading through the cylindrical wall 186 in the horizontal plane of the valve passage 195 is also an outlet passage 201, which may lead either to the oil well or to a cooling device when one is employed. The lower end of the valve member may also be provided with an additional passage 202 leading to an aperture 203 communicating with the oil well for a purpose to be explained.

In the form shown, the valve member 193 is provided with an operating member 204 extending to the outside of the casing, and if desired, said member may be given a hook shape, and also apertured at its end as illustrated, so that it may prevent removal of the cover plate over the active strainer, and also be wired or otherwise suitably locked to lugs 205 projecting upwardly from said cover plate if desired. Thereby not only may the valve be locked in its proper position against tampering or accidental displacement, but the cover plate of the active filter cannot be removed without first moving the valve member to discontinue the flow of oil into said chamber.

In the arrangement of the parts illustrated, oil returning to the oil well, as through the passages 36 and 37 of Fig. 1, enters the filter casing through the passage 200, and flowing through the valve passage 194 and passage 196, enters the top of the cup-shaped filter 190 in the chamber 187. The filtered oil flows out through the passage 198, the valve passage 195 and the outlet passage 201. In this position of the parts the operating member 204 has locked the cover plate 189 of chamber 187 against removal. If it is desired to clean the filter in use the operating member 204 is rotated through 180°, first disconnecting the lock 205 when one is used, and in this position of the parts the hot oil is delivered to the filter in the chamber 188 through valve passage 194, which now communicates with passage 197, and the filtered oil flows out of the chamber 188 through valve passage 195 which is now in communication with the passages 199 and 201. With this position of the parts the cover plate 189 of chamber 187 may be removed and the filter cleaned.

The inactive filter chamber may also be used as a filling opening for introducing additional quantities of oil to the oil reservoir. Thus with the position of parts shown in Fig. 22 the cover plate 189 of chamber 188 may be removed and new oil introduced through the opening thus provided, the oil flowing through passages 199, 202, and 203 into the reservoir.

In the embodiment shown in Fig. 25 the filter is associated directly with a cooling device of the type shown in Figs. 1 and 20. In this construction a cylindrical strainer 210 is mounted on the cooler casing around the outlet apertures 174, so that all oil leaving the cooler casing must pass through the strainer 210. This strainer can be made of any desired axial length, employing as large a screen surface as desired, so that the amount of filtering surface provided will assure proper filtering of the oil without the need of much pressure to force the oil through the screen. A large filtering surface also minimizes the inconvenience that is involved in cleaning or replacing the filter only when the bearing is out of operation.

In place of disposing the oil cooler below the bearing housing as shown in Fig. 1, the cooler, in any suitable construction, may be disposed adjacent the end of the shaft, as at the location of the chamber designated 212 in Fig. 5, in which case suitable passages will be provided for the flow of oil to and from the cooler housing.

Certain features of the invention are also available for use where forced circulation of oil is maintained through the bearing parts from an external source. For example, where passages 38 are provided for communication with both thrust bearing chambers as heretofore described, oil may be forced through the bearing chambers from a pipe communicating with the passage 39, as through the aperture closed by the left hand plug 41 in Fig. 1, the oil flowing through the thrust housing in the reverse direction from that heretofore described, although in the same direction across the bearing faces as heretofore described, and leaving the thrust bearing chambers through the passages 36 and 37, as heretofore described, flowing through the oil reservoir (which may or may not contain a cooling device of the type heretofore described) which would be provided with suitable outflow or overflow connections. In such a construction, if the pumping ring is to be omitted, a dummy ring may be used in the recess 16 to fill up the unnecessary cavity therein.

Where the present invention is employed in conjunction with the lubrication of motor bearings, it is desirable that the motor shaft be constructed as simply as possible and not interfere with the ready assembly and disassembly of the parts. In the embodiment of Figs. 15 and 16 the hub 106 of the pumping unit is shown as keyed to the shaft by a pin 107 projecting from the shaft, but such construction would require that the bearing shell be provided with a groove in order to provide for ready assembly and disassembly with the shaft. On the other hand, the shaft might be provided with a keyway extending inwardly from the end thereof and the pin be provided in the hub of the collar, or any other suitable provision may be provided to effect a positive drive of the collar without interfering with ready assembly and disassembly of the parts. The embodiment of Fig. 26 illustrates another construction whereby the pumping collar may be positively attached to the shaft without interfering with the ready assembly and disassembly of the parts.

The embodiment here shown closely follows that illustrated in Figs. 15 and 16 and corresponding parts are designated by the same reference characters. In this embodiment, however, the shaft is provided with a Woodruff keyway 214 and a suitable key 215 is carried by a spring 216, with which it may be formed as an integral part or suitably attached thereto. Spring 216 is suitably mounted on the hub 106 of the pumping unit so that the key 215 is normally urged in a direction to become engaged in the keyway 214 when the pumping unit is brought into alignment with the keyway 214, but there is sufficient clearance between the spring 216 and the recess in the hub within which the spring is disposed so that the key may be withdrawn from the keyway when the pumping unit is to be slid along the shaft. The ends of the key may be beveled as shown at 217 to facilitate its removal from the keyway when the pumping unit is to be withdrawn.

In the embodiments so far described, the peripheral or peripheral and lateral faces of a collar, whether thrust collar or especially provided pump collar, have been used for cooperation with the lubricating ring, but the lateral face of a collar may be used as the pumping surface without the use of the peripheral surface thereof, if such is desired, and in place of a separate thrust collar or special collar, the collar may be provided by a suitable flange on the shaft or other rotating element and the lateral surface or the peripheral surface or both lateral and peripheral surfaces of said flange may be employed for the pumping surface or surfaces.

Figs. 27 to 30 illustrate an embodiment of the present invention wherein the lateral face of a flange on a journal sleeve is employed as the pumping surface, this embodiment also showing how a lubricating ring embodying the present invention can be used in conjunction with centrifugal means for effecting lubrication of a journal bearing disposed above the surface of the oil, certain features thereof being disclosed in my application Serial No. 317,002, filed November 3, 1928, as to which this application is a continuation in part. But while this embodiment is illustrated in conjunction with a thrust bearing, it is apparent that the invention could be applied with equal facility to the lubricating of a journal bearing although not associated with a thrust bearing.

As shown, shaft 220 carries a journal sleeve 221 which is enlarged to provide a flange 222 to which a thrust bearing runner 223 is attached in any suitable way, as by dowels 224. The stationary elements of the thrust bearing are indicated at 225, and the shell 226 of the journal bearing suitably mounted as by bolts 227 on a housing element 228. Bearing shell 226 is provided with an annular chamber 229, and mounted within said chamber is a lubricating ring 230. As shown more particularly in Fig. 30, lubricating ring 230 is channel-shaped at its under or horizontal face so as to provide peripheral flanges 231 for engagement with the horizontal face 232 at the flange 222. Therefore, a confined pumping chamber 233 is provided within the lubricating ring 230 and between said ring and the flange surface 232.

The pumping chamber 233 is provided with a dam 234 (Fig. 29) which engages the flange surface 232 and separates the pumping chamber 233 into sections on either side thereof. On either side of said dam 234 is provided upwardly and laterally directed passages 235 and 236 which communicate with the pumping chamber and terminate in apertures 237 and 238 in the vertically extending arcuate flange 239 which engages the arcuately curved surface 240 of the bearing shell. The passages 235 and 236 are disposed in a box-like enlargement 241, shown more particularly in Fig. 28, and this enlargement is disposed in a lateral recess 242 extending from the annular chamber 229. The length of said recess 242 is such that its end walls constitute stops for engagement with one or the other of the radial faces of the enlargement 241 when one or the other of the apertures 237 and 238 are in register with a passage 243 which extends from the surface 240 of the bearing shell to the bearing grooves in the bearing surfaces of the journal bearing. The vertical flange 239 is also provided with two apertures 243 and 244, one on either side of the enlargement 241, and the bearing shell is provided with two recesses 245 and 246 which communicate respectively through the apertures 243 and 244 with the annular chamber 229.

If the level of the oil is such that oil may enter and fill the annular chamber 229 the lubricating ring described will operate to pump oil to and through the journal bearing. Where the level of the oil is below the flange surface 232, the oil may be raised to the annular chamber 229 in any suitable way. As shown, the flange 222 is provided with outwardly and upwardly directed passages 247 which, at their inner ends, communicate with the chamber 248 at the radially inner periphery of the runner 223, below the level of the oil, and which, at their outer extremities, communicate with an annular chamber 249 formed between the bearing sleeve, bearing shell housing element 228 and a suitable sealing ring 250. Chamber 249 communicates with the chamber 229 through passages 251, so that oil thrown radially outward by the centrifugal action of the passages 247 fills the chamber 249 and is forced by the pressure therein developed to flow upwardly and fill the chamber 229, from which the lubricating ring 230 takes the oil and develops a pressure therein whereby the oil is forced into the grooves of the journal bearing and caused to flow upwardly therethrough—being returned to the oil well, cooler or other suitable reservoir, as the case may be, by any suitable passages.

With the parts in the relationship shown in Figs. 27 to 30, oil may flow from the chamber 229 through the aperture 244 and recess 246 into the aperture 238 and passage 236 at the right-hand side of the dam 234 as viewed in Figs. 28 and 29. In this position of the parts, the shaft is rotating in an anticlockwise direction and the oil is pumped through the annular chamber 233 and out through the passage 235 and aperture 237 into the passage 243, through which it flows to the journal bearing surfaces. Upon reversal of rotation of the shaft, friction will cause the lubricating ring 230 to move until the opposite extremity of the enlargement 241 is engaged with the opposite wall of the recess 242, in which position aperture 238 is registered with passage 243 and aperture 237 communicates with recess 245. The direction in which the oil is pumped through the lubricating ring is now reversed, but otherwise the manner of operation is identically the same. In the event that the friction between the ring and flange face is not sufficient to assure movement of the lubricating ring with the flange face upon reversal in the direction of shaft rotation, spring-pressed rollers may be used in the chamber 229 between the bearing shell and lubricating ring so as to increase the friction of said ring on the face of the flange.

It will be perceived that in this embodiment of the invention, depending upon the speed of shaft rotation and the size of passages and pumping chamber employed, copious quantities of lubricant may be forced through the journal bearing—or any other suitable bearing either adjacent to or remote from the lubricating ring, and also through an oil cooling system if desired—and this oil circulation may be effected although the speed of rotation of the shaft may be relatively low. In the form shown, so long as the speed of rotation of the shaft is sufficient for the centrifugal action of the passages 247 to raise the oil through the relatively low vertical distance between the level of the oil in the well and the chamber 229, the lubricating ring 230 will develop such additional pressure as may be needed for effecting the proper lubrication of the journal bearing disposed above the same and the flow of the oil in proper quantities through it or other bearings, cooling devices, etc.

It will be perceived that other embodiments of this invention may likewise be adapted to cooperate with the lateral face of a collar or flange and that the embodiments described can be equally applied to the faces of other types of collars.

It will, therefore, be perceived that the present invention provides improved lubricating means which may be used in the lubrication of thrust bearings, or journal bearings, or combined thrust and journal bearings, or both thrust and journal bearings, which latter may be located more or less remote from each other. The present invention also provides a novel lubricating device which may be applied to horizontal, vertical or inclined shafts and to shafts having either direction of rotation without special design to take into consideration the direction of rotation to be employed, and where the shaft may rotate in both directions, the lubricating device is automatic in its action because it automatically assumes such position as is suitable for the direction in which the shaft is rotating.

Moreover, by means of the present invention, a lubricating device has been provided which cooperates with the surface of the shaft collar, utilizing the collar as a rotary pumping element, whereby copious quantities of oil may be circulated through one or more bearings whether they be journal or thrust bearings, and the pressure thereby developed may be utilized not only in lubricating parts which are more or less remote from the collar, but in circulating the oil through a cooling device either unitarily associated with the bearing or removed therefrom. Substantially the entire circumferential surface of the collar may be utilized in developing the desired pressure, or less than the entire circumferential surface of the collar may be so utilized, as desired, and the surface of the collar employed as the pumping surfaces may be the peripheral surface or one or both of the lateral surfaces or both peripheral and lateral surfaces. Also the invention could be applied to other rotating surfaces than those of a collar, as the surface of a flange on the shaft or a journal sleeve, as illustrated for example in the embodiment of Figs. 27 to 30. Therefore the term "collar 1" will be used herein as generic to a flange of any suitable character on a shaft or other rotatable element as well as a pump disk or collar, a thrust collar or any other suitable element of similar character.

Additionally, the lubricating device of this invention takes the form of a ring which is readily mountable on and demountable from the collar, requires no special construction of the collar, and may be readily standardized for different sizes of bearings and collars. Said ring may also be so constructed or mounted as to result in little or no wear of the parts, and to prevent improper mounting on the collar, and while available for either direction of shaft rotation, it can be locked so as to be nonautomatic for either desired direction of shaft rotation.

Furthermore, the present invention provides a lubricating system which involves a unitary and self-contained cooling device which occupies little space and assures adequate cooling of the oil, and at the same time filtering devices may be associated therewith, and if desired, said filtering devices may take a form which will enable them to be cleaned without interrupting the operation of the bearing.

While the embodiments of the invention illustrated have been described with a considerable particularity it is to be expressly understood that the invention is not restricted thereto, as it will now be apparent to those skilled in the art that many other embodiments, using some or all of the features of the present invention, may be readily provided without departing from the spirit of the invention. While it is preferred to utilize substantially the entire circumferential surface of the collar as a pumping surface, it is within the broader aspects of the invention to employ a readily mountable and demountable channel-shaped ring which utilizes only a part of the surface of the collar as a pumping surface. While it is preferred that the lubricating ring be so constructed as to be automatic in its action when the shaft is to rotate in either direction as well as suitable for either direction of shaft rotation when the shaft is to rotate in but a single direction, it is within the broader aspects of this invention to provide a readily mountable and demountable channel-shaped ring which is suitable for only one direction of shaft rotation or to lock the automatically operable lubricating ring against automatic action. While unitarily related self-contained oil cooling devices have been shown in some of the embodiments, it is to be expressly understood that the lubricating features of the invention per se may be used with any other suitable form of oil cooling means. It is also to be understood that the duplex oil filter described can be employed with other bearings than those embodying other features of the present invention.

While the invention has been illustrated, in some embodiments, as lubricating both a thrust bearing and a journal bearing associated therewith, it is to be expressly understood that the invention may be applied for lubricating only a thrust bearing, either single acting or double acting, or only a journal bearing, or journal bearings more or less remote from a thrust bearing, as well as to combined thrust and guide or steady bearings, the term journal bearing being used herein as embracing radial bearings whether used with vertical, inclined or horizontal shafts, and whether disposed adjacent a thrust bearing or remote from a thrust bearing or in the absence of any thrust bearing. Various features may also be used separately or in combination with only a part of the features heretofore described, and various changes may be made in the details of construction, arrangement and proportion of parts without departing from the spirit of the present invention. Reference is therefore to be had to the appended claims for a definition of the limits of the invention, and wherein the term "collar" is used as generic to a flange.

What is claimed is:

1. In a lubricating device for bearings, in combination with a shaft and one or more bearings to be lubricated, a collar rotating with the shaft, and a channel-shaped lubricating ring cooperating with but in action relatively stationary with respect to said collar and providing a chamber between the periphery of said collar and the inside of said ring, said ring having adjacent passages for leading oil to and from said chamber.

2. In a lubricating device for bearings, in combination with a shaft and one or more bearings to be lubricated, a collar rotating with the shaft, and a channel-shaped lubricating ring carried by said collar, said ring having a chamber between the periphery of said collar and said ring, inlet and outlet passages communicating with said chamber and a dam in said chamber between said ring and said collar.

3. In a lubricating device for bearings, in combination with a shaft and one or more bearings to be lubricated, a collar rotating with the shaft, and a channel-shaped lubricating ring carried by said collar, said ring having an annular chamber between said collar and said ring, inlet and outlet passages communicating with said chamber and a dam in said ring between said passages, said inlet and outlet passages being adjacent to each other whereby said annular chamber extends throughout substantially the entire periphery of said collar.

4. In a lubricating device for bearings, in combination with a shaft and one or more bearings to be lubricated, a collar rotating with the shaft, a channel-shaped lubricating ring mounted on said collar and provided with a chamber between said collar and said ring and inlet and outlet passages communicating with said chamber, said ring being movable with said collar upon change in the direction of shaft rotation, and means to limit the movement of said ring to position said passages for a reversal of flow of the lubricant through said chamber.

5. In a lubricating device for bearings, in combination with a shaft and one or more bearings to be lubricated, a collar rotating with the shaft, a channel-shaped lubricating ring cooperating with but in action relatively stationary with respect to said collar and provided with a chamber between said collar and said ring and inlet and outlet passages communicating with said chamber, and means associated with said ring whereby said collar may operate to pump oil through said chamber for either direction of shaft rotation.

6. In a lubricating device for bearings, in combination with a shaft and one or more bearings to be lubricated, a collar rotating with the shaft, a channel-shaped lubricating ring carried by said collar and forming a pump chamber therebetween, inlet and outlet passages in said ring communicating with said pump chamber, a dam in said ring for deflecting oil through said outlet passage, and a passage leading from said outlet passage to the bearing or bearings to be lubricated.

7. In a lubricating device for bearings, in combination with a shaft and one or more bearings to be lubricated, a collar rotating with the shaft, a channel-shaped lubricating ring mounted on said collar and forming a pump chamber therebetween, inlet and outlet passages in said ring communicating with said pump chamber, a dam in said ring engaging said collar, means cooperating with said ring to prevent wear by reason of the wedging action of the oil on said dam, and a passage leading from the outlet passage of said ring to the bearing or bearings to be lubricated.

8. In a lubricating device for bearings, in combination with a shaft and one or more bearings to be lubricated, a collar rotating with the shaft, a channel-shaped lubricating ring mounted on said collar and forming a pump chamber therebetween, inlet and outlet passages in said ring communicating with said pump chamber, a dam in said ring engaging said collar, one or more shoes carried by said ring and engaging said collar, and passages leading from the outlet passage of said ring to the bearing or bearings to be lubricated.

9. In a lubricating device for bearings, in combination with a shaft and one or more bearings to be lubricated, a collar rotating with the shaft, a channel-shaped lubricating ring cooperating with but in action relatively stationary with respect to said collar and forming a pump chamber therebetween, inlet and outlet passages in said ring communicating with said pump chamber, and a passage leading from the outlet passage of said ring to the bearing or bearings to be lubricated and including a conduit formed on said ring.

10. In a lubricating device for bearings, in combination with a shaft and one or more bearings to be lubricated, a collar rotating with the shaft, a channel-shaped lubricating ring mounted on said collar and forming a pump chamber therebetween, inlet and outlet passages in said ring communicating with said pump chamber, said passages being automatically positioned by the rotation of said collar to enable said collar to pump oil into and out of said pump chamber for either direction of shaft rotation, and a passage leading from the outlet passage of said ring to the bearing or bearings to be lubricated.

11. In a lubricating device for bearings, in combination with a shaft and one or more bearings to be lubricated, a collar rotating with the shaft, a channel-shaped lubricating ring mounted on said collar and forming a pump chamber therebetween, inlet and outlet passages in said ring communicating with said pump chamber, a valve structure cooperating with said passages and automatically operated by the collar whereby oil may be pumped into and out of said pump chamber for either direction of shaft rotation, and a passage leading from the outlet passage of said collar to the bearing or bearings to be lubricated.

12. In a lubricating device for bearings, in combination with a shaft and one or more bearings to be lubricated, a collar rotating with the shaft, a channel-shaped lubricating ring mounted on said collar and forming a pump chamber therebetween, inlet and outlet passages in said ring communicating with said pump chamber, means cooperating with said ring for balancing the resultant of the pressures acting on said ring, and a passage leading from the outlet of said ring to the bearing or bearings to be lubricated.

13. In a lubricating device for bearings, in combination with a shaft, a collar rotating with said shaft, a channel-shaped lubricating ring cooperating with but in action relatively stationary with respect to said collar, a passage for leading oil to the bearing or bearings to be lubricated from an aperture in a surface adjacent said lubricating ring, a source of oil communicating with an aperture in a surface adjacent said lubricating ring, and passages in said ring communicating with said apertures whereby said collar cooperates with said ring to constitute a rotary pump.

14. In a lubricating device for bearings, in combination with a shaft, a collar rotating with said shaft, a channel-shaped lubricating ring carried by said collar, passages leading to the bearing or bearings to be lubricated from an aperture in a surface adjacent said lubricating ring, a source of oil communicating with apertures in a surface adjacent said lubricating ring, passages in said ring cooperating with said apertures whereby said collar cooperates with said ring to constitute a rotary pump, and means cooperating with said ring for positioning said ring passages in cooperation with said apertures for either direction of shaft rotation.

15. In a lubricating device for bearings, in combination with a shaft, a collar rotating with said shaft, a channel-shaped lubricating ring mounted on said collar, passages leading to the bearing or bearings to be lubricated from an aperture in a surface adjacent said lubricating ring, a source of oil communicating with apertures in a surface adjacent said lubricating ring, passages in said ring cooperating with said apertures, said ring having a limited movement to change the registry of said passages with said apertures upon change in the direction of shaft rotation, and means cooperating with said ring to position said ring for different directions of shaft rotation.

16. In a lubricating device for bearings, in combination with a shaft, a collar rotating with said shaft, a channel-shaped lubricating ring mounted on said collar, passages leading to the bearing or bearings to be lubricated from an aperture in a surface adjacent said lubricating ring, a source of oil communicating with apertures in a surface adjacent said lubricating ring, and passages in said ring communicating with the chamber between said collar and said ring and cooperating with said apertures to constitute an automatic valve structure for completing communication between said ring passages and said source of oil and first named passage for either direction of shaft rotation.

17. In a lubricating device for bearings, in combination with a shaft, a collar rotating with said shaft, a channel-shaped lubricating ring mounted on said collar, passages leading to the bearing or bearings to be lubricated from an aperture in a surface adjacent said lubricating ring, a source of oil communicating with apertures in a surface adjacent said lubricating ring, and passages in said ring communicating with the chamber between said collar and said ring, said ring having a limited movement with said collar sufficiently to bring the ring passage which is forward in the direction of shaft rotation into registry with an aperture communicating with said source of oil and the other of said passages into registry with the first named passage for either direction of shaft rotation.

18. In a lubricating device for bearings, in combination with a shaft, a collar rotating therewith and one or more bearings to be lubricated, a channel-shaped lubricating ring cooperating with but in action relatively stationary with respect to said collar and cooperating therewith to provide a pump which utilizes substantially the entire peripheral surface of said collar as a pumping surface, a source of oil communicating with the interior of said ring, and a passage leading from the interior of said ring to the bearing or bearings to be lubricated.

19. In a lubricating device for bearings, in combination with a shaft, a collar rotating therewith and one or more bearings to be lubricated, a channel-shaped lubricating ring cooperating with the lateral surface of said collar but in operation relatively stationary with respect thereto to provide an annular pumping chamber, a source of oil communicating with the interior of said ring, and a passage leading from the interior of said ring to the bearing or bearings to be lubricated.

20. In a lubricating device for bearings, in combination with a shaft, a collar rotating therewith and one or more bearings to be lubricated, a channel-shaped lubricating ring cooperating with but in action relatively stationary with respect to said collar, means cooperating with said ring for rendering said collar effective as a rotary pump for either direction of shaft rotation, a source of oil communicating with the interior of said ring, and a passage leading from the interior of said ring to the bearing or bearings to be lubricated.

21. In a lubricating device for bearings, in combination with a shaft, a collar rotating therewith and one or more bearings to be lubricated, a channel-shaped lubricating ring carried by said collar and an automatic valve structure cooperating with said ring whereby said collar constitutes a rotary pump for either direction of shaft rotation, a source of oil communicating with the interior of said ring, and a passage leading from the interior of said ring to the bearing or bearings to be lubricated.

22. In a lubricating device for bearings, in combination with a shaft, a collar rotating therewith and one or more bearings to be lubricated, a channel-shaped ring cooperating with but in action relatively stationary with respect to said collar and utilizing the peripheral and lateral surfaces of said collar as rotary pumping surfaces, a source of oil communicating with the interior of said ring, and a passage leading from the interior of said ring to the bearing or bearings to be lubricated.

23. In a lubricating device for bearings, in combination with a shaft, a collar rotating therewith and one or more bearings to be lubricated, a channel-shaped ring cooperating with but in action relatively stationary with respect to said collar and having contiguous inlet and outlet passages, a dam interposed between said passages and engaging said collar, a source of oil communicating with the inlet passage, and a passage leading from the outlet passage to the bearing or bearings to be lubricated.

24. In a lubricating device for bearings, in combination with a shaft, a collar rotating therewith and one or more bearings to be lubricated, a lubricating ring mounted on said collar, said ring providing a chamber between said ring and collar and having inlet and outlet passages communicating therewith, a dam between said passages, a source of oil communicating with said chamber, a passage leading from said chamber to the bearing or bearings to be lubricated, and means for reversing the communication between said ring passages and said source of oil and last named passage upon the reversal of the direction of shaft rotation.

25. In a lubricating device for bearings, in combination with a shaft, a collar rotating therewith and one or more bearings to be lubricated, a lubricating ring mounted on said collar, said ring providing a chamber between said collar and ring and having inlet and outlet passages communicating therewith, said ring having a limited rotary movement with said collar upon change in the direction of shaft rotation, and a source of oil and a passage leading to the bearing or bearings to be lubricated in communication with said first named passages for either position of said ring.

26. In a lubricating device for bearings, in combination with a shaft, a collar rotating with said shaft and one or more bearings to be lubricated, a lubricating ring carried by said collar and forming therewith an annular pumping chamber, a dam within said ring engaging said collar, passages in said ring communicating with said pumping chamber on opposite sides of said dam, a source of oil, a passage leading to the bearing or bearings to be lubricated, and valve means cooperating with said passages whereby said collar will pump oil from said source to said last named passage for either direction of shaft rotation.

27. In a lubricating device for bearings, in combination with a shaft, a collar rotating with said shaft and one or more bearings to be lubricated, a lubricating ring mounted on said collar and forming therewith an annular pumping chamber, a dam within said ring engaging said collar, passages in said ring communicating with said pumping chamber on opposite sides of said dam, a source of oil, a passage leading to the bearing or bearings to be lubricated, said ring being movable with said collar through a limited distance upon change in the direction of shaft rotation, and means cooperating with said ring whereby one of said ring passages is an inlet communicating with said source and the other of said ring passages is an outlet communicating with said passage leading to the bearing or bearings in either position of said ring.

28. In a lubricating device for bearings, in combination with a shaft, a collar rotating with said shaft and one or more bearings to be lubricated, a lubricating ring mounted on said collar and forming therewith an annular pumping chamber, a dam within said ring engaging said collar, passages in said ring communicating with said pumping chamber on opposite sides of said dam, a source of oil and a passage leading to the bearing or bearings to be lubricated in communication with said ring passages, and means cooperating with said ring for balancing the pressures acting on said ring.

29. In a lubricating device for bearings, in combination with a shaft, a collar rotating with said shaft and one or more bearings to be lubricated, a lubricating ring mounted on said collar and forming therewith an annular pumping chamber, a dam within said ring engaging said collar, passages in said ring communicating with said pumping chamber on opposite sides of said dam, a source of oil and a passage leading to the bearing or bearings to be lubricated in communication with said ring passages, and one or more shoes carried by said ring to maintain said ring concentric with said collar.

30. In a lubricating device for bearings, in combination with a shaft, a collar rotating with said shaft and one or more bearings to be lubricated, a channel-shaped ring mounted on the periphery of said collar and forming therewith an annular pumping chamber, a dam within said ring engaging the periphery of said collar, passages in said ring communicating with said pumping chamber on opposite sides of said dam, a source of oil and a passage leading to the bearing or bearings to be lubricated in communication with said ring passages and a plurality of bridges carried by said ring and engaging the periphery of said collar.

31. In a lubricating device for bearings, in combination with a shaft, a collar rotating with said shaft and one or more bearings to be lubricated, a lubricating ring mounted on said collar and forming therewith an annular pumping chamber, a dam within said ring engaging said collar, passages in said ring communicating with said pumping chamber on opposite sides of said dam, a source of oil, a passage leading to the bearing or bearings to be lubricated, and a pair of passages leading from said source of oil to said ring, said ring being movable with said collar through a limited distance upon change in direction of shaft rotation to register one or the other of its passages with one or the other of said passages leading from the source of oil, the other of said ring passages communicating with the passage leading to the bearings for either direction of shaft rotation.

32. In a lubricating device for bearings, in combination with a shaft, a collar rotating therewith and one or more bearings to be lubricated, a channel-shaped ring mounted on said collar and forming therewith an annular chamber, a dam between said ring and said collar, a passage leading to said annular chamber on each side of said dam, and lateral walls cooperating with the lateral faces of said ring and provided with passages for leading oil from a source of oil to said ring passages and for leading oil from said ring passages to the bearing or bearings to be lubricated.

33. In a lubricating device for bearings, in combination with a shaft, a collar rotating therewith and one or more bearings to be lubricated, a channel-shaped ring mounted on said collar and forming therewith an annular chamber, a dam between said ring and said collar, a passage leading to said annular chamber on each side of said dam, and lateral walls cooperating with the lateral faces of said ring and provided with a pair of passages leading from a source of oil and adapted to register with one or the other of said ring passages and with a passage leading to the bearing or bearings to be lubricated and adapted to register with the other of said ring passages.

34. In a lubricating device for bearings, in combination with a shaft, a collar rotating therewith and one or more bearings to be lubricated, a channel-shaped ring mounted on said collar and forming therewith an annular chamber, a dam between said ring and said collar, a passage leading to said annular chamber on each side of said dam, lateral walls cooperating with the lateral faces of said ring and provided with a pair of passages leading from a source of oil and adapted to register with one or the other of said ring passages and with a passage leading to the bearing or bearings to be lubricated and adapted to register with the other of said ring passages, said ring having a limited movement with the collar to register one or the other of said ring passages with said lateral wall passages in accordance with the direction of shaft rotation, and means for positioning said ring for either direction of shaft rotation.

35. In a lubricating device for bearings, in combination with a shaft, a collar rotating therewith and one or more bearings to be lubricated, a channel-shaped ring mounted on said collar and forming therewith an annular chamber, a dam in said chamber, a passage leading to said annular chamber on each side of said dam, lateral walls cooperating with the sides of said ring and provided with passages leading from a source of oil to the ring and from the ring to the bearing or bearings to be lubricated and adapted to register with one or the other of said ring passages depending upon the direction of shaft rotation, and means to lock said ring against rotary movement with the collar with its passages in communication with said lateral wall passages for one direction of shaft rotation.

36. In a lubricating device for bearings, in combination with a shaft, a collar rotating therewith, a housing for the shaft and collar and one or more bearings to be lubricated, a lubricating ring carried by said collar and forming a pumping chamber therebetween, passages in said ring communicating with said chamber and with a source of oil and the bearing or bearings to be lubricated, said ring having a limited rotary movement with said collar, means for limiting said movement, and an inspection hole in said housing adjacent said ring.

37. In a lubricating device for bearings, in combination with a shaft, a collar rotating therewith, a housing for the shaft and collar and one or more bearings to be lubricated, a lubricating ring carried by said collar, passages in said ring, means cooperating with said passages whereby said collar operates as a rotary pumping member for either direction of shaft rotation, said ring normally having a limited rotary movement with said collar, and means carried by the housing for locking said ring with respect to said collar.

38. In a lubricating device for bearings, in combination with a shaft, a collar rotating therewith, and one or more bearings to be lubricated, a channel-shaped lubricating ring cooperating with but in action relatively stationary with respect to said collar and providing a pumping chamber having passages into and out of said chamber, and means controlling said passages whereby said collar cooperates with said ring to constitute a rotary pumping member for either direction of shaft rotation.

39. In a lubricating device for bearings, in combination with a shaft, a collar rotating therewith, a housing for the shaft and collar and one or more bearings to be lubricated, a lubricating ring mounted on said collar, passages in said ring whereby said collar cooperates with said ring to constitute a rotary pumping member, recesses in said housing of different radial depth for receiving different portions of said ring, and means on said ring cooperating with the recess of greater depth for properly locating said ring with respect to said collar.

40. In a lubricating device for bearings, in combination with a shaft, a collar rotating therewith and one or more bearings to be lubricated, a channel-shaped lubricating ring cooperating with but in action relatively stationary with respect to said collar, said ring cooperating with said collar to provide an annular pumping chamber between said collar and said ring, and inlet and outlet conduits communicating with said chamber and carried by said ring.

41. In a lubricating device for bearings, in combination with a shaft, a collar rotating therewith and one or more bearings to be lubricated, a channel-shaped lubricating ring carried by the periphery of said collar, said ring cooperating with the periphery of said collar to provide a pumping chamber between the periphery of said collar and said ring, an inlet to said pumping chamber, an outlet from said pumping chamber, and an automatic valve device mounted in said outlet passage and operated by a reversal of shaft rotation to control the outlet from said chamber.

42. In a lubricating device for bearings, in combination with a shaft, a collar rotating therewith, and one or more bearings to be lubricated, a channel-shaped lubricating ring carried by said collar and forming an annular pumping chamber which embraces the lateral walls of said collar, and inlet and outlet passages communicating with said chamber.

43. In a lubricating device for bearings, in combination with a shaft, a collar rotating therewith and one or more bearings to be lubricated, a channel-shaped lubricating ring cooperating with but in action relatively stationary with respect to said collar, said ring throughout its periphery embracing but spaced from the periphery and portions of the lateral faces of said collar, said peripheral and lateral portions of said collar constituting pumping surfaces and said ring cooperating with said collar to provide an annular pumping chamber, inlet and outlet passages communicating therewith, and means cooperating with said passages whereby oil is pumped through said chamber for either direction of shaft rotation.

44. In a lubricating device for bearings, in combination with a shaft, a collar rotating therewith and one or more bearings to be lubricated, a channel-shaped lubricating ring mounted on said collar, said ring cooperating with said collar to provide an annular pumping chamber, projections on said ring, and means cooperating with said projections to balance the pressures acting on said ring.

45. In a lubricating device for bearings, in combination with a shaft, a collar rotating therewith and one or more bearings to be lubricated, a channel-shaped lubricating ring carried by said collar, said ring cooperating with said collar to provide an annular pumping chamber, a dam between said ring and collar adjacent the lowermost point thereof, and inlet and outlet passages communicating with said chamber on the opposite sides of said dam.

46. In a lubricating device for bearings, in combination with a shaft, a collar rotating therewith and one or more bearings to be lubricated, a channel-shaped lubricating ring mounted on said collar and providing an annular pumping chamber therein, dams between said ring and said collar, and pairs of passages in said ring communicating with said chamber on the opposite sides of said dams.

47. In a lubricating device for bearings, in combination with a shaft, a collar rotating therewith and one or more bearings to be lubricated, a lubricating ring mounted on said collar and frictionally movable therewith, said ring forming with said collar an annular pump chamber, a dam between said ring and collar, passages in said ring communicating with said chamber on opposite sides of said dam, passages for leading oil to and from said ring, and means for limiting the rotary movement of said ring so that one ring passage is in communication with a passage for leading oil to the ring and the other ring passage in communication with a passage leading oil from the ring for either direction of shaft rotation.

48. In a lubricating device for bearings, in combination with a shaft, a collar rotating therewith, a plurality of bearings to be lubricated and a housing enclosing chambers for said bearings, shaft and collar, a channel-shaped lubricating ring cooperating with but in action relatively stationary with respect to said collar and cooperating therewith to provide a pumping chamber, inlet and outlet passages communicating with said chamber, said outlet passages communicating with one of said bearing chambers, and one or more passages in the wall of said housing for leading the lubricant from one bearing chamber to another.

49. In a lubricating device for bearings, in combination with a shaft, a collar rotating therewith, a plurality of bearings to be lubricated and a housing enclosing chambers for said bearings, shaft and collar, a channel-shaped lubricating ring carried by said collar and cooperating therewith to provide a pumping chamber, inlet and outlet passages communicating with said chamber, said outlet passage communicating with one of said bearing chambers, and one or more passages in the wall of said housing for leading the lubricant from one bearing chamber to another, said passages including a flexibly mounted element to permit relative movement between the elements of the respective bearings.

50. In a lubricating system for bearings, in combination with a shaft, a collar rotating therewith, a housing for said shaft and collar and including an oil well in unitary relationship therewith, and one or more bearings to be lubricated, means in said well for cooling the oil, a channel-shaped lubricating ring carried by said collar and cooperating therewith to provide a pump chamber, an inlet for said chamber communicating with cooled oil in said oil well, an outlet for said chamber communicating with the bearing or bearings to be lubricated and passages leading from said bearing or bearings to the inlet of said coil.

51. In a lubricating system for bearings, in combination with a shaft, a collar rotating therewith, a housing for said shaft and collar and including an oil well, and one or more bearings to be lubricated, a channel-shaped lubricating ring carried by said collar and cooperating therewith to provide an annular pumping chamber, a dam between said ring and said collar adjacent the lower portion of said ring, passages in said ring on the opposite sides of said dam, a passage in the housing leading oil from said well to one of said ring passages, and a passage in the housing leading oil from another of said ring passages to the bearing or bearings to be lubricated.

52. In a lubricating system for bearings, in combination with a shaft, a collar rotating therewith, a housing for said shaft and collar and including an oil well, and one or more bearings to be lubricated, a channel-shaped lubricating ring mounted on said collar and movable therewith through a limited distance, means for limiting the rotary movement of said ring, said ring cooperating with said collar to provide an annular pumping chamber, a dam between said ring and the periphery of said collar adjacent the lower portion thereof, passages in said ring communicating with said chamber at each side of said dam, and passages in said housing leading from said oil well and to said bearing or bearings to be lubricated and registering with one or the other of said ring passages for each direction of shaft rotation.

53. In a lubricating system for bearings, in combination with a shaft, a collar rotating therewith, a housing for said shaft and collar and including an oil well and one or more bearings to be lubricated, a channel-shaped lubricating ring cooperating with but in action relatively stationary with respect to said collar and forming an annular pumping chamber therewith, passages in said ring for leading oil into and out of said chamber, passages in said bearing housing for leading oil from the oil well to said chamber and from said chamber to the bearing or bearings to be lubricated, and passages in the wall of said housing for returning the oil from said bearing or bearings to said oil well.

54. In a lubricating system for bearings, in combination with a shaft, a collar rotating therewith, a housing for said shaft and collar and including an oil well and one or more bearings to be lubricated, oil pumping means cooperating with said collar, passages in said bearing housing for leading oil from the oil well to said pumping means and from said pumping means to the bearing or bearings to be lubricated, and a self-contained oil cooler insertible as a unit into said oil well and located in the flow of oil to said last named passages.

55. In a lubricating system for bearings, in combination with a shaft, a collar rotating therewith, a housing for said shaft and collar and including an oil well and one or more bearings to be lubricated, oil pumping means cooperating with said collar, passages in said bearing housing for leading oil from the oil well to said pumping means and from said pumping means to the bearing or bearings to be lubricated, and a self-contained unitary oil cooler insertible into said oil well through an opening in the lateral wall thereof and located in the flow of oil to said last named passages, and an oil filter unitarily associated with said oil cooler.

56. In a lubricating system for bearings, in combination with a shaft, a collar rotating therewith, a housing for said shaft and collar and including an oil well and one or more bearings to be lubricated, oil pumping means cooperating with said collar, passages in said bearing housing for leading oil from the oil well to said pumping means and from said pumping means to the bearing or bearings to be lubricated, and a self-contained unitary oil cooler insertible into said oil well through an opening in the lateral wall thereof and located in the flow of oil to said last named passages, said oil cooler including a sheet metal cylindrical casing and water cooling coils and baffles insertible as a unit into said cylindrical housing.

57. In a lubricating system for bearings, in combination with a shaft, a collar rotating therewith, a housing for said shaft and collar and including an oil well and one or more bearings to be lubricated, oil pumping means cooperating with said collar, passages in said bearing housing for leading oil from the oil well to said pumping means and from said pumping means to the bearing or bearings to be lubricated, a self-contained oil cooling device insertible as a unit into said oil well and located in the flow of oil to said last named passages, and a duplex oil strainer associated therewith.

58. In a lubricating system for bearings, in combination with a shaft, a collar rotating therewith, a housing for said shaft and collar and including an oil well and one or more bearings to be lubricated, oil pumping means cooperating with said collar, passages in said bearing housing for leading oil from the oil well to said pumping means and from said pumping means to the bearing or bearings to be lubricated, a self-contained oil cooler insertible as a unit into said oil well and located in the flow of oil to said last named passages, a pair of oil strainers associated with said cooler, and means for passing the oil through either of said strainers so that the other strainer may be cleaned without interrupting the operation of the bearing.

59. In a lubricating device for bearings, in combination with a shaft and one or more bearings to be lubricated, a collar rotating with the shaft, a channel-shaped lubricating ring mounted on said collar and embracing the lateral faces thereof, a dam within said ring engaging the periphery and lateral faces of said collar, and inlet and outlet passages communicating with the chamber between said ring and collar on opposite sides of said dam.

60. In a lubricating device for bearings, in combination with a shaft and one or more bearings to be lubricated, a collar rotating with the shaft, a channel-shaped lubricating ring mounted on said collar, inlet and outlet passages in said ring and communicating with the chamber between said ring and collar, and a member provided with apertures registering with the ends of said passages for controlling the direction of oil circulation through said chamber.

61. In a lubricating device for bearings, in combination with a shaft and one or more bearings to be lubricated, a collar rotating with the shaft, a channel-shaped lubricating ring mounted on said collar, inlet and outlet passages in said ring and communicating with the chamber between said collar and ring, said ring having a limited movement with said collar, and a member provided with apertures for registry with the ends of said passages when said ring is at either limit of its movement.

62. In a lubricating device for bearings, in combination with a vertical shaft and one or more bearings to be lubricated, a horizontal collar rotating with the shaft, a channel-shaped lubricating ring mounted on said collar, inlet and outlet passages in said ring and communicating with the chamber between said ring and collar, and means on said ring for supporting said ring from a lateral face of said collar.

63. In a lubricating device for bearings, in combination with a shaft and one or more bearings to be lubricated, a collar rotating with the shaft, a channel-shaped lubricating ring mounted on said collar, inlet and outlet passages in said ring communicating with the chamber between said ring and collar and disposed diametrically with respect to said collar, and dams between said inlet and outlet passages whereby the oil pressures within said ring are balanced.

64. In a lubricating device for bearings, in combination with a shaft and one or more bearings to be lubricated, a collar rotating with the shaft, a channel-shaped lubricating ring mounted on said collar, inlet and outlet passages in said ring communicating with the chamber between said ring and collar and disposed diametrically with respect to said collar, dams between said inlet and outlet passages, said ring having a limited movement with said collar, and a member provided with apertures for registry with the ends of said inlet and outlet passages when said ring is at either limit of its movement.

65. In a lubricating device for bearings, in combination with a shaft and one or more bearings to be lubricated, a collar rotating with the shaft, a channel-shaped lubricating ring mounted on said collar and provided with inlet and outlet passages communicating with the chamber between said ring and collar, a source of oil, said ring having a limited rotation with said collar, and apertured means cooperating with said inlet and outlet passages whereby oil is pumped from said source to said bearing or bearings to be lubricated for either direction of shaft rotation.

66. In a lubricating device for bearings, in combination with a shaft and one or more bearings to be lubricated, a collar rotating with the shaft, a channel-shaped lubricating ring mounted on said collar and provided with inlet and outlet passages communicating with the chamber between said ring and collar, a source of oil, said ring having a limited rotation with said collar, and means provided with apertures which register with said inlet and outlet passages at either limit of movement of said ring whereby the chamber between said ring and collar is in communication with said source of oil and the bearing or bearings to be lubricated for either direction of shaft rotation.

67. In a lubricating device for bearings, in combination with a shaft and one or more bearings to be lubricated, a collar rotating with the shaft, and a channel-shaped lubricating ring mounted on and disposed between the inner and outer periphery of a lateral face of said collar, said ring providing a pumping chamber with the lateral face of said collar and having passages leading oil to and from said chamber.

68. In a lubricating device for bearings, in combination with a shaft and one or more bearings to be lubricated, a collar rotating with the shaft, a channel-shaped lubricating ring mounted on a lateral face of said collar and forming an annular chamber between the face of said collar and the inside of said ring, a dam in said chamber, and passages in said ring communicating with said chamber on the opposite sides of said dam.

69. In a lubricating device for bearings, in combination with a shaft and one or more bearings to be lubricated, a collar rotating with the shaft, a channel-shaped lubricating ring mounted on a lateral face of said collar and forming a pump chamber therewith, a dam in said chamber, passages in said ring communicating with said pump chamber on opposite sides of said dam, a passage leading to the bearings to be lubricated, and means mounting said lubricating ring whereby one or the other of the passages in said ring will register with said passage leading to the bearing depending on the direction of rotation of said shaft.

70. In a lubricating device for bearings, in combination with a shaft and one or more bearings to be lubricated, a collar rotating with the shaft, a channel-shaped lubricating ring mounted on said collar and forming a pump chamber with a lateral face of said collar, a dam in said chamber, passages communicating with said chamber on opposite sides of said dam, said ring having movement with said collar through a limited distance for either direction of shaft rotation, a passage communicating with the bearing to be lubricated and positioned to register with one or the other of said ring passages depending upon the direction of shaft rotation, and passages positioned to communicate with the other of said ring passages and form an inlet passage to said pump chamber for either direction of shaft rotation.

71. In a lubricating device for bearings, in combination with a shaft, a collar rotating with the shaft and one or more bearings above the collar, a channel-shaped lubricating ring mounted for cooperation with a lateral face of said collar and forming a pump chamber therewith, a dam in said chamber, and passages in said ring communicating with said chamber on each side of said dam, passages for leading oil to and from said lubricating ring, said ring being movable with said collar through a limited distance on reversal of direction of shaft rotation to register one of said ring passages with a passage for leading oil from said ring and the other of said passages with a passage leading oil to said ring whereby oil is pumped by said ring to the bearing or bearings disposed above the same for either direction of shaft rotation.

72. In a lubricating device for bearings, in combination with a shaft, a collar rotating with the shaft and one or more bearings above the collar, a channel-shaped lubricating ring mounted for cooperation with a lateral face of said collar and forming a pump chamber therewith, a dam in said chamber, passages in said ring communicating with said chamber on each side of said dam, passages for leading oil to and from said lubricating ring, said ring being movable with said collar through a limited distance on reversal of direction of shaft rotation to register one of said ring passages with a passage for leading oil from said ring and the other of said passages with a passage leading oil to said ring, and centrifugally operating means for forcing oil through the passage leading oil to said ring.

73. In a lubricating device for bearings, in combination with a shaft, a collar rotating therewith and one or more bearings to be lubricated, a relatively stationary channel-shaped lubricating ring embracing but spaced throughout its periphery from the periphery and portions of the lateral faces of said collar, said peripheral and lateral portions of said collar constituting pumping surfaces and said ring cooperating with said collar to provide an annular pumping chamber, and inlet and outlet passages communicating with said pumping chamber.

74. In a lubricating device for bearings, the combination with a shaft and one or more bearings to be lubricated, a collar rotating with the shaft, a channel-shaped lubricating ring mounted on a lateral face of said collar and forming an annular pumping chamber between the face of said collar and the inside of said ring, a dam in said chamber, passages in said ring communicating with said chamber on the opposite sides of said chamber, said ring having a limited movement with said collar upon reversal of the direction of shaft rotation, and a passage leading to the bearing or bearings to be lubricated and communicating with one or the other of said ring passages dependent upon the direction of shaft rotation.

75. In a lubricating device for bearings, in combination with a shaft and one or more bearings to be lubricated, a collar rotating with the shaft and a channel-shaped lubricating ring mounted on said collar and movable therewith through a limited distance upon reversal of shaft rotation, said ring forming a pumping chamber with said collar and having inlet and outlet passages communicating with said chamber, and a passage leading to the bearing or bearings to be lubricated and brought into communication with the outlet from said chamber by the movement of said ring at each reversal of shaft rotation.

76. In a lubricating device for bearings, in combination with a shaft and one or more bearings to be lubricated, a collar rotating with the shaft, a channel-shaped lubricating ring mounted on a lateral face of said collar and centered by a cylindrical surface at right angles to said lateral face, said channel-shaped lubricating ring forming a pumping chamber between the face of said collar and the inside of said ring, a dam in said chamber, and passages in said ring communicating with said chamber on the opposite sides of said dam.

77. In a lubricating device for bearings, in combination with a shaft and one or more bearings to be lubricated, a collar rotating with the shaft, a channel-shaped lubricating ring cooperating with but in action relatively stationary with respect to a surface of said collar and forming with said surface a pumping chamber inside of said ring, a dam in said pumping chamber, and passages in said ring communicating with said pumping chamber at the opposite sides of said dam.

78. In a lubricating device for bearings, in combination with a shaft and one or more bearings to be lubricated, a collar rotating with the shaft, a channel-shaped lubricating ring cooperating with but in action relatively stationary with respect to a surface of said collar and forming with said surface a pumping chamber inside of said ring, a dam in said pumping chamber, passages in said ring communicating with said pumping chamber at the opposite sides of said dam, said ring being mounted for limited rotational movement, passages selectively brought into communication with said ring passages by said limited rotational movement and adapted to lead oil to said pumping chamber and from said pumping chamber to said bearing or bearings to be lubricated for either direction of shaft rotation, and means for stopping the limited rotation of said ring with said passages aligned for the existing direction of shaft rotation.

HARRY A. S. HOWARTH.